US008389963B2

(12) United States Patent
Kubota

(10) Patent No.: US 8,389,963 B2
(45) Date of Patent: Mar. 5, 2013

(54) LASER PROCESSING DEVICE

(75) Inventor: Makoto Kubota, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 13/338,319

(22) Filed: Dec. 28, 2011

(65) Prior Publication Data

US 2012/0181454 A1 Jul. 19, 2012

(30) Foreign Application Priority Data

Jan. 19, 2011 (JP) ................................ 2011-009018

(51) Int. Cl.
*G21K 5/10* (2006.01)

(52) U.S. Cl. .............. 250/492.1; 250/492.2; 250/492.22

(58) Field of Classification Search .... 250/492.1–492.3, 250/306, 307, 310, 311
See application file for complete search history.

(56) References Cited

FOREIGN PATENT DOCUMENTS

| | | | |
|---|---|---|---|
| JP | 2009-078280 | | 4/2009 |
| JP | 2009078280 | * | 4/2009 |
| JP | 2011-020143 | | 2/2011 |
| JP | 2011-056522 | | 3/2011 |

* cited by examiner

*Primary Examiner* — Michael Maskell
(74) *Attorney, Agent, or Firm* — Kilyk & Bowersox, P.L.L.C.

(57) ABSTRACT

Provided is a laser processing device capable of preventing laser light from leaking out to the outside of the housing by emitting the laser light to the processing target with the camera detached. The laser processing device includes a laser generator; a scanning optical system for scanning the laser light with respect to a workpiece; a housing frame for accommodating the scanning optical system; a camera for photographing the workpiece, the camera being removably attached to the housing frame and having a light receiving axis branched from an emission axis of the laser light; a camera cover removably attached to the housing frame to cover the camera; a limit SW for detecting detachment of the camera cover from the housing frame; and a laser output control section for prohibiting the emission of the laser light to the workpiece based on a cover detection signal.

8 Claims, 19 Drawing Sheets

LASER MARKING SYSTEM 1

LASER MARKING SYSTEM 1

ILLUMINATION MODULE 530

ATTACHMENT UNIT 565

B-B CROSS-SECTIONAL VIEW

NORMAL

VARIATION IN ATTACHMENT ANGLE

VARIATION IN POSITION OF IMAGING ELEMENT

CAMERA COVER 70

LASER PROCESSING DEVICE

CROSS-REFERENCE TO RELATED APPLICATIONS

The present application claims foreign priority based on Japanese Patent Application No. 2011-009018, filed Jan. 19, 2011, the contents of which is incorporated herein by reference.

BACKGROUND OF THE INVENTION

1. Field of the Invention

The present invention relates to laser processing devices, and more specifically, to improvement of a laser processing device that processes a processing target by applying laser light.

2. Description of Related Art

A laser marking device is a laser processing device that processes a processing target (workpiece) by applying laser light, and characters, marks, figures, and the like can be printed on the workpiece by scanning an irradiation position of the laser light. In such a laser marking device, there is known a device in which the workpiece is photographed by a camera and check and adjustment of a processing position are carried out (e.g., Japanese Unexamined Patent Publication No. 2009-78280).

The laser marking device described in Japanese Unexamined Patent Publication No. 2009-78280 incorporates a camera for photographing the workpiece in a head housing, and carries out the check and adjustment of the processing position at high accuracy before the processing by making a light receiving axis of the camera coincide with an emission axis of the laser light.

This type of laser marking device has a head housing of a dustproof structure made from a light shielding member such as metal and accommodates, in the head housing, an optical system for emitting the laser light to prevent leakage of the laser light and to prevent degradation in performance due to the influence of dust and the like. Thus, the camera coaxial with the laser light axis described in Japanese Unexamined Patent Publication No. 2009-78280 is accommodated in such a head housing and hence cannot be attached/detached by a user, whereby the camera cannot be replaced.

In order to be able to replace the camera, the camera needs to be attached to the exterior of the head housing, and to this end, a camera opening for drawing out the light receiving axis of the camera to the exterior of the head housing needs to be provided in the head housing. However, if such a configuration is adopted, the laser light may be emitted from the camera opening as return light from the workpiece or scattered light by the optical system. For example, if the camera is detached during laser irradiation or if the laser irradiation is carried out without the camera being attached, the laser light may leak out to the exterior of the head housing.

SUMMARY OF THE INVENTION

In view of the above circumstances, an object of the present invention is to provide a laser processing device in which a camera, for photographing a processing target, having a light receiving axis branched from an emission axis of laser light, can be attached or detached. It is also an object thereof to provide a laser processing device in which the camera can be safely replaced.

In particular, an object thereof is to provide a laser processing device capable of preventing the laser light from leaking to an exterior of a housing by outputting the laser light with the camera detached. It is also an object thereof to provide a laser processing device capable of preventing the laser light from leaking to the exterior of the housing even if the camera is detached during the output of the laser light.

Moreover, an object thereof is to provide a laser processing device capable of reliably detecting that a camera cover is detached from the housing and preventing the laser light from being output when the camera cover is not attached. Further, it is also an object thereof to provide a laser processing device capable of adjusting variations in a position of an imaging element in the camera and the attachment angle of the camera.

A laser processing device according to one embodiment of the present invention is a laser processing device including a controller for controlling a laser generator for generating laser light adapted to process a processing target; and a head with a scanning optical system for scanning the laser light with respect to the processing target and a housing for accommodating the scanning optical system; the laser processing device including a camera for photographing the processing target, the camera being removably attached to the housing and having a light receiving axis branched from an emission axis of the laser light; a camera cover being removably attached to the housing to cover the camera; a cover detection section for detecting detachment of the camera cover from the housing; and a laser output control section for prohibiting emission of the laser light to the processing target based on the detection result of the cover detection section.

In such a laser processing device, return light from the processing target can be received through the optical path that is substantially coaxial with the laser light by the camera attached to the housing, so that check and adjustment of the processing position can be carried out at high accuracy before the processing. The camera can be detached from the housing to be replaced with the desired camera. However, when detaching the camera, first, the camera cover for covering the camera must be detached from the housing. When the camera cover is detached, this detachment is detected by the cover detection section, and the emission of the laser light to the processing target is prohibited. According to such a configuration, the laser light can be prevented from leaking out to the outside of the housing as the return light from the processing target or scattered light by the optical system when the laser light is emitted toward the processing target with the camera detached from the housing.

In addition to the configuration described above, the laser processing device according to another embodiment of the present invention includes a shutter for blocking a light receiving path of the camera in an openable/closable manner and blocking the light receiving path upon output of the laser light.

According to such a configuration, the laser light can be prevented from leaking out to the outside of the housing even if the camera is detached during the emission of the laser light. Thus, a user can safely detach the camera any time. Furthermore, the laser light can be emitted toward the processing target even if the camera is not attached. Therefore, the user can safely replace the camera.

In addition to the configuration described above, in the laser processing device according to still another embodiment of the present invention, the camera cover includes a projection, and the cover detection section includes a mechanical contact that shifts to a conducting state when the camera cover is attached to the housing and the projection is brought into contact, and shifts to a blocking state when the camera cover is detached from the housing.

According to such a configuration, the detachment of the camera cover from the housing is reliably detected, and the laser light can be prevented from being emitted toward the processing target in a state in which the camera cover is not attached.

In addition to the configuration described above, in the laser processing device according to still another embodiment of the present invention, the laser generator includes an excitation light source for generating excitation light and a laser oscillator for generating the laser light based on the excitation light, an excitation light source power supply for supplying power to the excitation light source using a commercial power supply is further arranged, and the laser output control section is adapted to control the power supply with respect to the excitation light source power supply based on the detection result of the cover detection section. According to such a configuration, the power supply to the excitation light source power supply can be blocked when the camera cover is detached from the housing, so that the laser light can be reliably prevented from being emitted toward the processing target.

In addition to the configuration described above, in the laser processing device according to still another embodiment of the present invention, the excitation light source includes a light emitting element and a drive circuit for supplying a drive current to the light emitting element; and the laser output control section is adapted to instruct a current value of the drive current with respect to the drive circuit based on the detection result of the cover detection section.

According to such a configuration, the power supply to the excitation light source power supply can be blocked and the current supply to the light emitting element of the excitation light source can be stopped when the camera cover is detached from the housing, so that the laser light can be more reliably prevented from being emitted toward the processing target.

In addition to the configuration described above, the laser processing device according to still another embodiment of the present invention includes a notifying section for notifying that the camera cover is detached from the housing based on the detection result of the cover detection section. According to such a configuration, the detachment of the camera cover from the housing can be quickly recognized.

In addition to the configuration described above, the laser processing device according to still another embodiment of the present invention includes a camera mount for arranging the camera on an exterior of the housing, the camera mount including an offset adjustment mechanism for making a light receiving axis of the camera side substantially coincide with a light receiving axis of the housing side and an angle adjustment mechanism for adjusting an attachment angle of the camera with the light receiving axis as a center. According to such a configuration, the variations in the position of the imaging element in the camera and the attachment angle of the camera can be adjusted.

In addition to the configuration described above, the laser processing device according to still another embodiment of the present invention includes a telecentric lens for making an emission angle of the laser light constant irrespective of an incident angle of the laser light, the telecentric lens being arranged on the processing target side than the scanning optical system; and an optical splitter for branching a light receiving path of the camera from the emission path of the laser light, the optical splitter being arranged on the laser generator side than the scanning optical system.

According to such a configuration, the irradiation position of the laser light and the photographing position by the camera can be made to coincide at high accuracy in view of the optical characteristics of the scanning optical system. Thus, the check or adjustment of the processing position can be carried out at high accuracy based on the photographed image. Furthermore, since the laser light is applied to the processing target at a constant angle even if the exit light axis of the laser light is scanned, the accuracy of the laser processing can be enhanced, the photographed image with less distortion can be obtained, and the check or adjustment of the processing position can be carried out at high accuracy.

In the laser processing device according to the present invention, the light receiving axis branched from the emission axis of the laser light is provided, and the camera for photographing the processing target can be attached or detached. In particular, by emitting the laser light toward the processing target with the camera detached from the housing, the laser light can be prevented from leaking out to the outside of the housing as the return light from the processing target or the scattered light by the optical system.

In the laser processing device according to the present invention, even if the camera is detached during the emission of the laser light, the laser light can be prevented from leaking out to the outside of the housing and the user can detach the camera any time. Moreover, the laser light can be emitted toward the processing target even if the camera is not attached. Therefore, the user can safely replace the camera.

Furthermore, in the laser processing device according to the present invention, the detachment of the camera cover from the housing is reliably detected, and the emission of the laser light toward the processing target in a state in which the camera cover is not attached can be prevented. Moreover, the variations in the position of the imaging element in the camera and the attachment angle of the camera can be adjusted in the laser processing device according to the present invention.

DETAILED DESCRIPTION OF PREFERRED EMBODIMENTS

<Laser Marking System 1>

Figure 1:
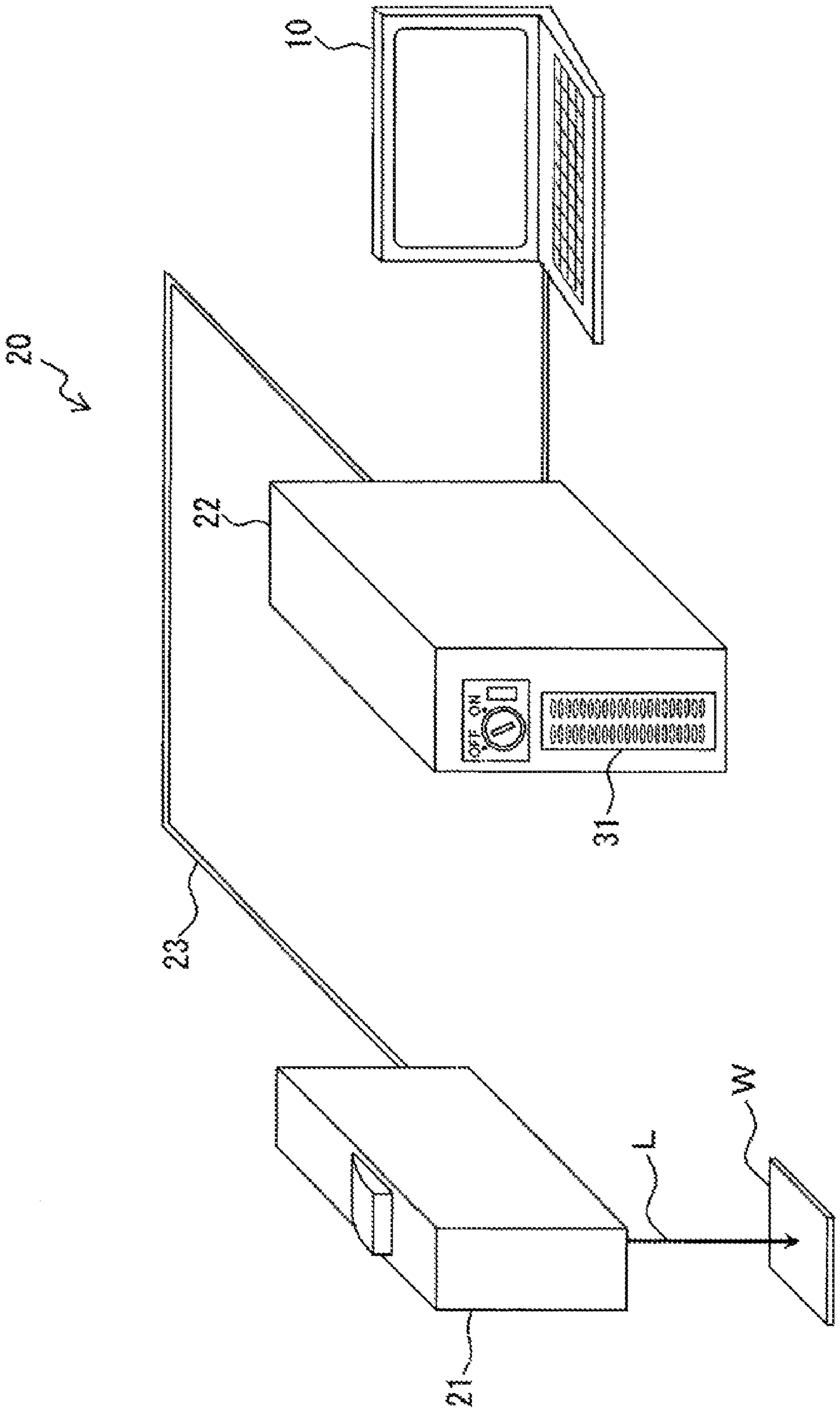
FIG. 1 is a system diagram showing one example of a schematic configuration of a laser marking system including a laser marker according to an embodiment of the present invention.

FIG. 1 is a system diagram showing one example of a schematic configuration of a laser marking system 1 including a laser processing device according to an embodiment of the present invention, where a laser marker 20 is shown as an example of the laser processing device. The laser marking system 1 is configured by the laser marker 20 for processing a workpiece W by applying laser light L, and a terminal device 10 for editing the processing conditions. The laser marker 20 includes a marker head 21 for generating and scanning the laser light L, and a marker controller 22 for carrying out the operation control of the marker head 21.

The terminal device 10 is a device for controlling the laser marker 20, and may be a personal computer installed with a laser marker application program, for example. A user uses the terminal device 10 to create and edit processing setting data defining the processing conditions of the laser marker 20.

The marker controller 22 carries out the operation control of the marker head 21 based on the processing setting data received from the terminal device 10. Excitation light for laser oscillation is generated in the marker controller 22 and transmitted to the marker head 21 through an optical fiber 23. The marker controller 22 includes a terminal block 31 having a plurality of input/output terminals for connecting an external device such as a PLC.

The marker head 21 generates the laser light L based on the excitation light from the marker controller 22, and applies the laser light L to the workpiece W. Here, symbols such as characters, marks, and figures can be printed on the workpiece W by scanning the emission axis of the laser light L based on a control signal from the marker controller 22. An illumination light source and a camera (not shown) are incorporated in the marker head 21, where a photographed image of the workpiece W photographed by the relevant camera is transferred to the terminal device 10 through the marker controller 22 and displayed on a display. The user can also check or adjust the processing position on the workpiece W by browsing the photographed image.

<Laser Marker 20>

Figure 2:
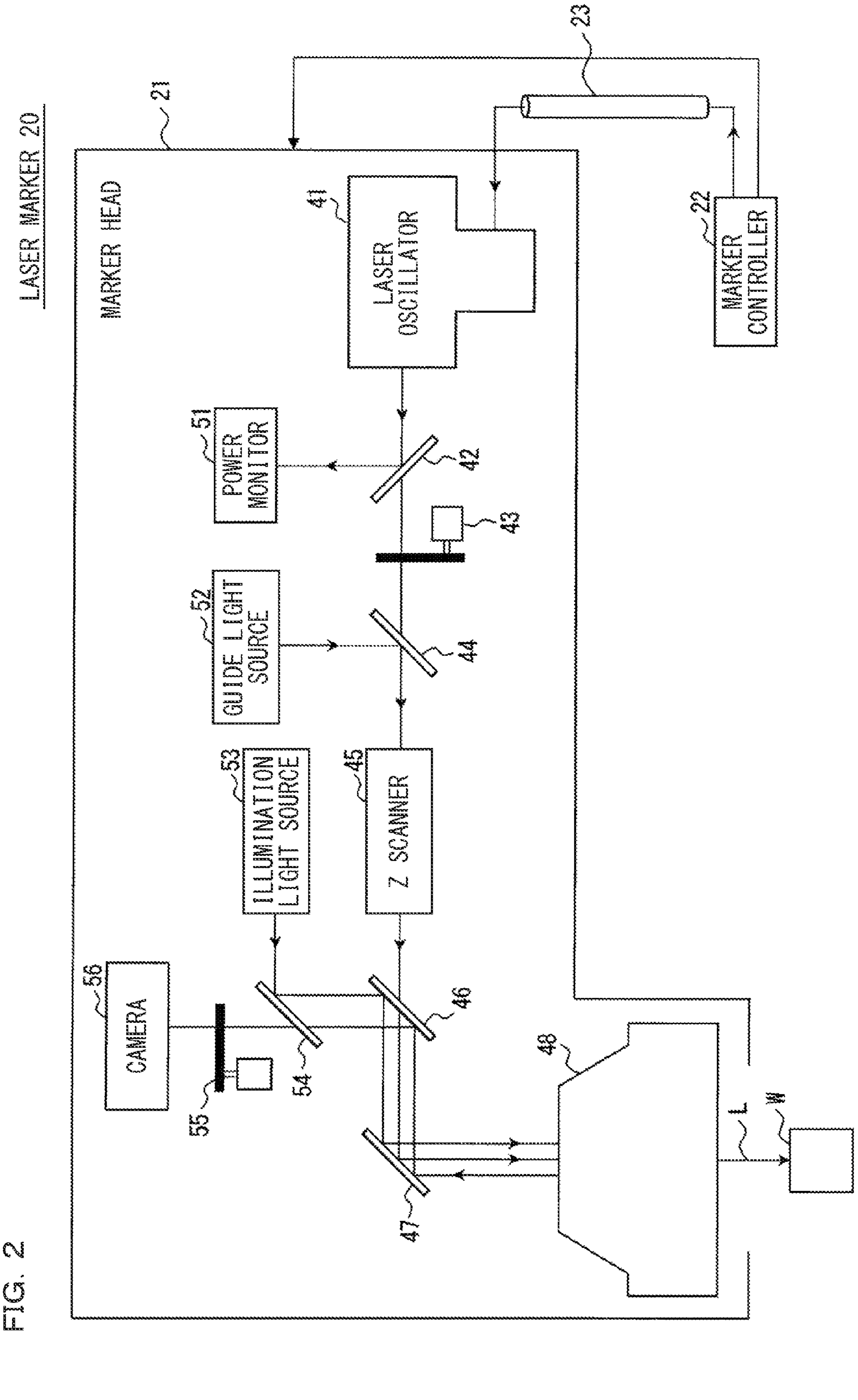
FIG. 2 is a block diagram showing a detailed configuration of the laser marker of FIG. 1.

FIG. 2 is a block diagram showing a detailed configuration of the laser marker 20 of FIG. 1, and shows one example of an internal configuration of the marker head 21 and the marker controller 22.

The laser marker 20 can carry out a highly accurate laser processing by applying the laser light L through a telecentric lens 48. Furthermore, the laser marker 20 is provided with an illumination light source 53 for photographing the workpiece W and a camera 56, which are arranged such that an optical axis of the illumination light source 53 and a photographing axis of the camera 56 are coaxial with the emission axis of the laser light L. Thus, a photographed image with less distortion can be obtained through the telecentric lens 48.

The illumination light source 53 generates an illumination light including a wavelength substantially the same as the laser light L, and the camera 56 photographs the return light having the wavelength substantially the same as the laser light. Thus, the workpiece W can be photographed using the light having the wavelength substantially the same as the laser light L, and a clear photographed image can be obtained. Furthermore, by providing a camera shutter 55 on the photographing axis of the camera 56, the laser light L reflected by the workpiece W is prevented from entering the camera 56 as return light and damaging the camera 56.

<Marker Controller 22>

The marker controller 22 supplies power to the marker head 21 using a commercial power supply, and generates the excitation light for laser oscillation. The excitation light is transmitted to the marker head 21 through the optical fiber 23. Furthermore, the marker controller 22 controls the marker head 21 based on the processing setting data transferred from the terminal device 10, and carries out the output control and the scanning control of the laser light L.

<Marker Head 21>

The marker head 21 is configured by a laser oscillator 41, a beam sampler 42, an oscillator shutter 43, a mixing mirror 44, a Z scanner 45, a polarized beam splitter 46, an XY scanner 47, the telecentric lens 48, a power monitor 51, a guide light source 52, the illumination light source 53, a half mirror 54, the camera shutter 55, and the camera 56.

The laser oscillator 41 is a laser generator for generating the laser light L including the laser beam by absorbing the excitation light, and is configured by a laser medium, a resonator, a Q switch, and the like. The laser oscillator 41 is assumed herein as a fixed laser oscillator that performs pulse oscillation, for example, an SHG laser oscillator. The SHG laser oscillator uses $YVO_4$ (yttrium vanadate) crystal doped with Nd (neodymium) for the laser medium, and uses a second harmonic to output green light having a wavelength of 532 nm. The laser light having a wavelength of 808 nm is used for the excitation light for exciting the above laser medium. The laser light L generated by the laser oscillator 41 passes through the beam sampler 42, the mixing mirror 44, the Z scanner 45, the polarized beam splitter 46, the XY scanner 47, and the telecentric lens 48 in this order, and is applied to the workpiece W.

The beam sampler 42 is an optical splitter for branching a constant rate of the laser light L output from the laser oscillator 41 as a sampling beam. For example, about 3% of the entire light quantity of the input laser light L is divided by using surface reflection of a transparent substrate, and the like, and input to the power monitor 51 as a sampling beam. The power monitor 51 is a light intensity detection section for detecting the output power of the laser oscillator 41 and includes a thermosensitive element such as a thermopile, and the detection result thereof is used in the output control of the laser oscillator 41.

The oscillator shutter 43 is a leakage prevention blocking section for preventing the leakage of the laser light L by blocking the emission path of the laser light L in an openable/closable manner, and is arranged on an upstream side than the polarized beam splitter 46. The oscillator shutter 43 is arranged between the beam sampler 42 and the mixing mirror 44 herein, so that the emission path of the laser light L is blocked except for the time of the irradiation of the laser light L based on an output control signal of the laser light L. Thus, the emission path of the laser light L is blocked by the oscillator shutter 43 at the time of photographing the workpiece W by the camera 56.

The mixing mirror 44 is a light mixing optical splitter for making an emission axis of guide light substantially coincide with the emission axis of the laser light L, where the laser light L from the laser oscillator 41 is transmitted and the guide light from the guide light source 52 is reflected so that they are both sent to the Z scanner 45. The guide light source 52 is a light source device for generating the guide light for displaying the processing position on the workpiece W, and includes a light emitting element such as an LD (Laser Diode). The symbol pattern to be printed can be visually recognized as an after-image of the irradiation spot by the lighting control of the guide light and the high-speed scanning of the emission axis of the guide light.

The Z scanner 45 is a beam diameter control section for adjusting the beam diameter of the laser light L, and includes two lenses arranged on the optical axis of the laser light L, where the beam diameter of 2 mmϕ of the laser light L can be enlarged to a maximum of 8 mmϕ, for example, by changing the relative distance of such lenses. The defocus control of lowering the energy density in the spot can be carried out by enlarging the spot diameter of the laser light.

The polarized beam splitter 46 is a camera optical splitter, arranged on the upstream side than the XY scanner 47 on the emission path of the laser light L, for transmitting the laser light L from the Z scanner 45 and making the light receiving axis of the camera 56 substantially coincide with the emission axis of the laser light L. In other words, the return light entering the telecentric lens 48 and going back the emission path of the laser light L of the reflected light by the workpiece W is reflected by the polarized beam splitter 46 so as to separate from the emission axis of the laser light L and enter the camera 56. The polarized beam splitter 46 reflects the illumination light that entered through the half mirror 54 toward the XY scanner 47, and makes the emission axis of the illumination light coincide with the emission axis of the laser light L. For example, if the laser light L of P polarized light is generated by the laser oscillator 41, the P polarized light component is selectively transmitted, and the laser light L is transmitted while the return light including the S polarized light component and the irradiation light are respectively reflected by using the polarized beam splitter 46 for reflecting the S polarized light component.

The XY scanner 47 is a scanning device for two-dimensionally scanning the emission axis of the laser light L, and includes an optical system such as a scanning mirror for reflecting the laser light L and a drive unit for turning the scanning mirror. The scanning mirror is called a galvano-mirror, and is arranged on the emission path of the laser light L. The XY scanner 47 turns the scanning mirror based on a position control signal from the marker controller 22.

The telecentric lens 48 is an emission optical system for emitting the laser light L toward the workpiece W, and is arranged on the downstream side than the XY scanner 47, that is, the workpiece W side in the emission path of the laser light L. The telecentric lens 48 is configured by a plurality of optical lenses and a cover glass, and includes an object side telecentric optical system in which the field angle on the workpiece W side is about 0°. That is, the telecentric lens 48 emits the laser light L toward the workpiece W such that the main light ray of the laser light becomes substantially parallel to the lens optical axis regardless of the incident angle of the laser light L.

The illumination light source 53 is a light source device adapted to generate illumination light for illuminating the workpiece W, and includes a light emitting element such as an LED (light emitting diode). The illumination light source 53 generates the illumination light having the wavelength substantially the same as at least the laser light L, and emits the same to the half mirror 54.

The half mirror 54 is an illumination optical splitter, arranged on a light receiving path of the camera 56, for transmitting the return light from the polarized beam splitter 46 and making the emission axis of the illumination light substantially coincide with the light receiving axis of the camera 56. In other words, the half mirror 54 transmits the return light from the polarized beam splitter 46 to enter the camera 56, and reflects the illumination light from the illumination light source 53 toward the polarized beam splitter.

The camera shutter 55 is a camera protecting blocking section for blocking the light receiving path of the camera 56 in an openable/closable manner to prevent the return light from entering the camera 56 at the time of the irradiation of the laser light L, and is arranged on the upstream side than the polarized beam splitter 46. In this case, the camera shutter 55 is arranged between the half mirror 54 and the camera 56, opened and closed based on the output control signal of the laser light L, and blocks the light receiving path of the camera 56 at least during the irradiation period of the laser light L. Thus, the camera 56 can be prevented from being damaged by the return light of the laser light L by making the timing of the laser irradiation and the timing of the camera photographing different.

The camera 56 is an imaging unit for photographing the workpiece W and generating a photographed image, and the camera 56 carries out photographing based on an imaging control signal from the marker controller 22 and outputs the obtained photographed image to the marker controller 22. Herein, the camera 56 is assumed to receive the light having the wavelength substantially the same as the laser light and generate the photographed image.

<Telecentric Lens 48>

Figure 3A:
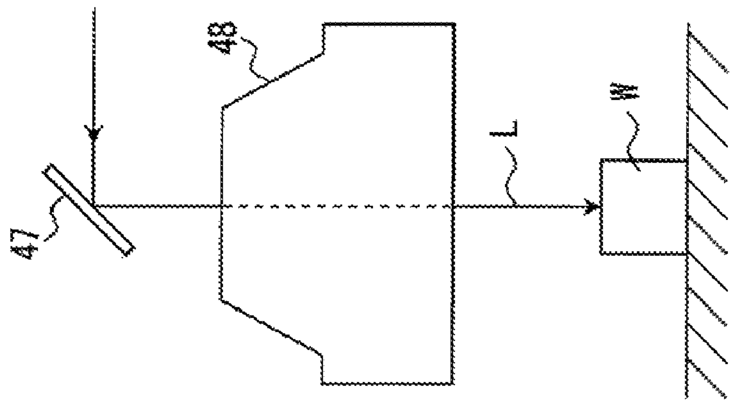
FIGS. 3A to 3C are explanatory views showing one example of an operation of a telecentric lens of FIG. 2.
Figure 3B:
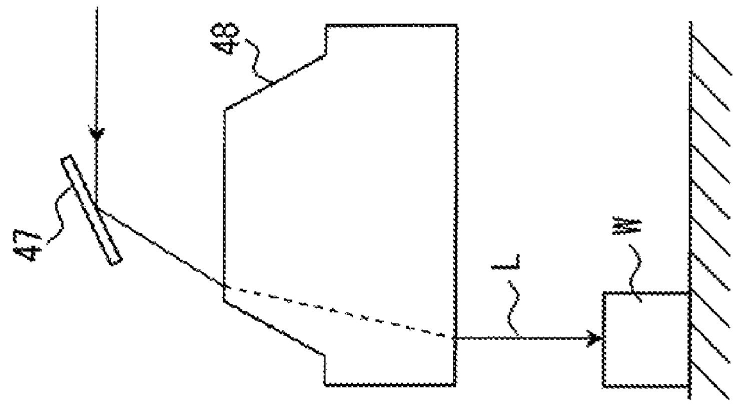
Figure 3C:
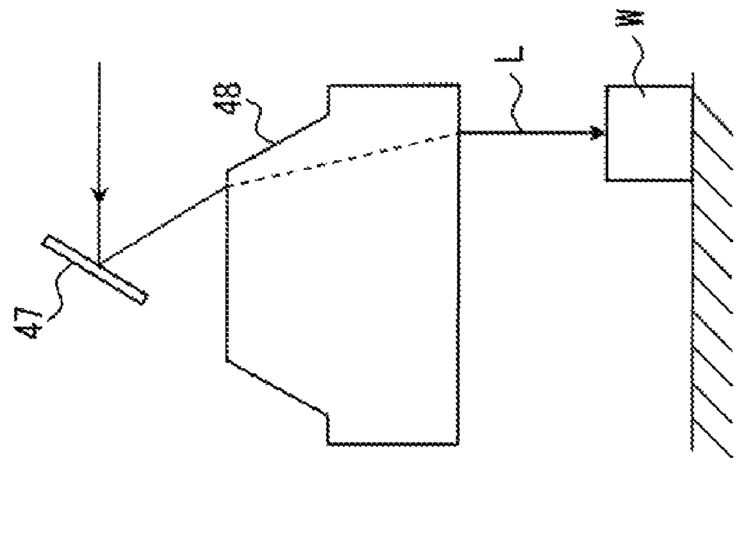

FIGS. 3A to 3C are explanatory views showing one example of the operation of the telecentric lens 48 of FIG. 2. FIG. 3A shows a case in which the laser light L is applied to the middle of a printable area, FIG. 3B shows a case in which the laser light L is applied to near the left end of the printable area, and FIG. 3C shows a case in which the laser light L is applied to near the right end of the printable area.

The telecentric lens 48 emits the laser light L such that the main light ray thereof becomes substantially parallel to the optical axis of the telecentric lens 48 regardless of the incident angle of the laser light L. Thus, the spot diameter of the laser light L formed on the workpiece W does not change and highly accurate laser processing can be carried out even if the scan angle of the XY scanner 47 becomes deep and the incident angle to the telecentric lens 48 becomes large.

In such a laser marker 20, the photographed image with less distortion can be obtained by photographing the workpiece W using the camera 56 having a light receiving axis substantially coincide with the emission axis of the laser light L. In other words, the photographed image does not distort even if the scan angle of the XY scanner 47 becomes deep and the incident angle to the telecentric lens 48 becomes large. Furthermore, the surrounding image also does not distort in the photographed image regardless of the scan angle of the XY scanner 47. Therefore, the check or adjustment of the processing position can be made at high accuracy based on the photographed image with less distortion.

<Half Mirror 54>

Figure 4:
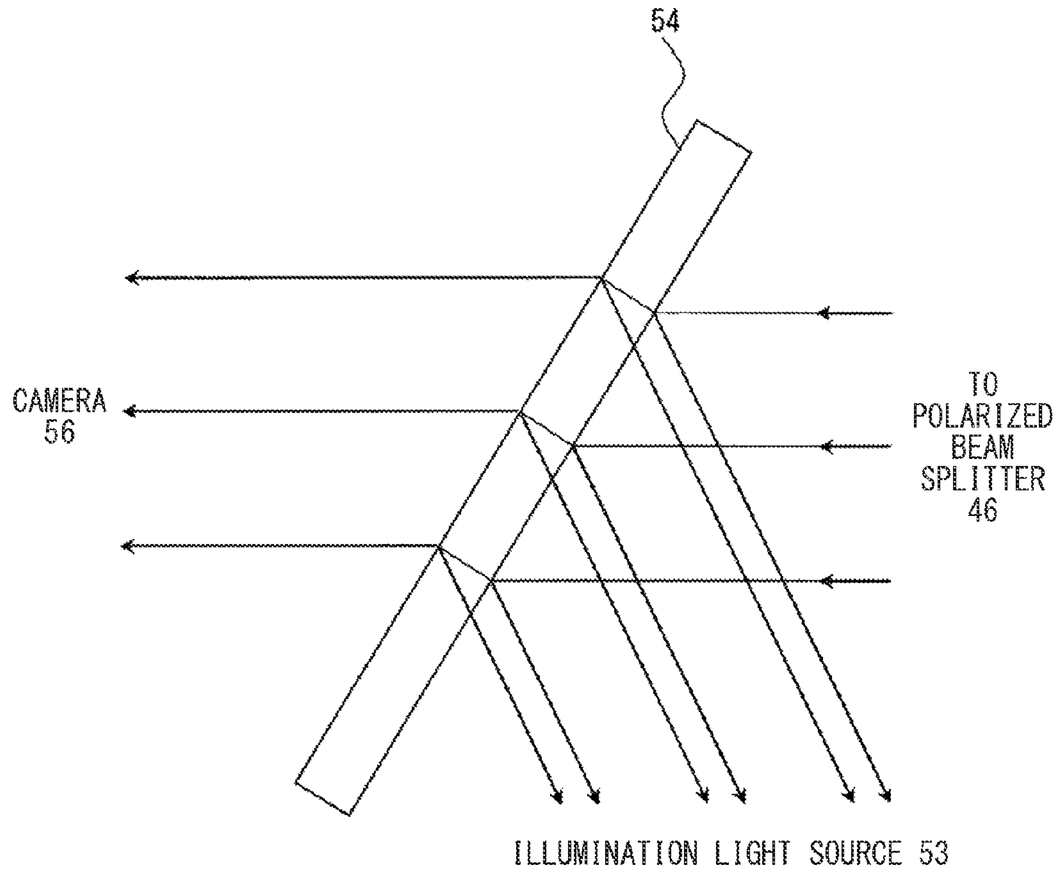
FIG. 4 is an explanatory view showing one example of an optical path passing through a half mirror of FIG. 2.

FIG. 4 is an explanatory view showing one example of an optical path that passes the half mirror 54 of FIG. 2. The reflection at the half mirror 54 occurs at a first surface to which the light enters, and also at a second surface opposing the first surface. Thus, a ghost in which the image appears to be doubled occurs if the reflected light of the half mirror 54 is photographed. Such a problem does not arise if a transmitted light is photographed.

Thus, a clear photographed image can be obtained by arranging the camera 56 in a direction in which the return light that entered from the polarized beam splitter 46 is emitted through the half mirror 54, and arranging the illumination light source 53 so that the illumination light reflected by the half mirror 54 enters the polarized beam splitter 46.

<Spatial Arrangement of Optical Unit>

Figure 5:
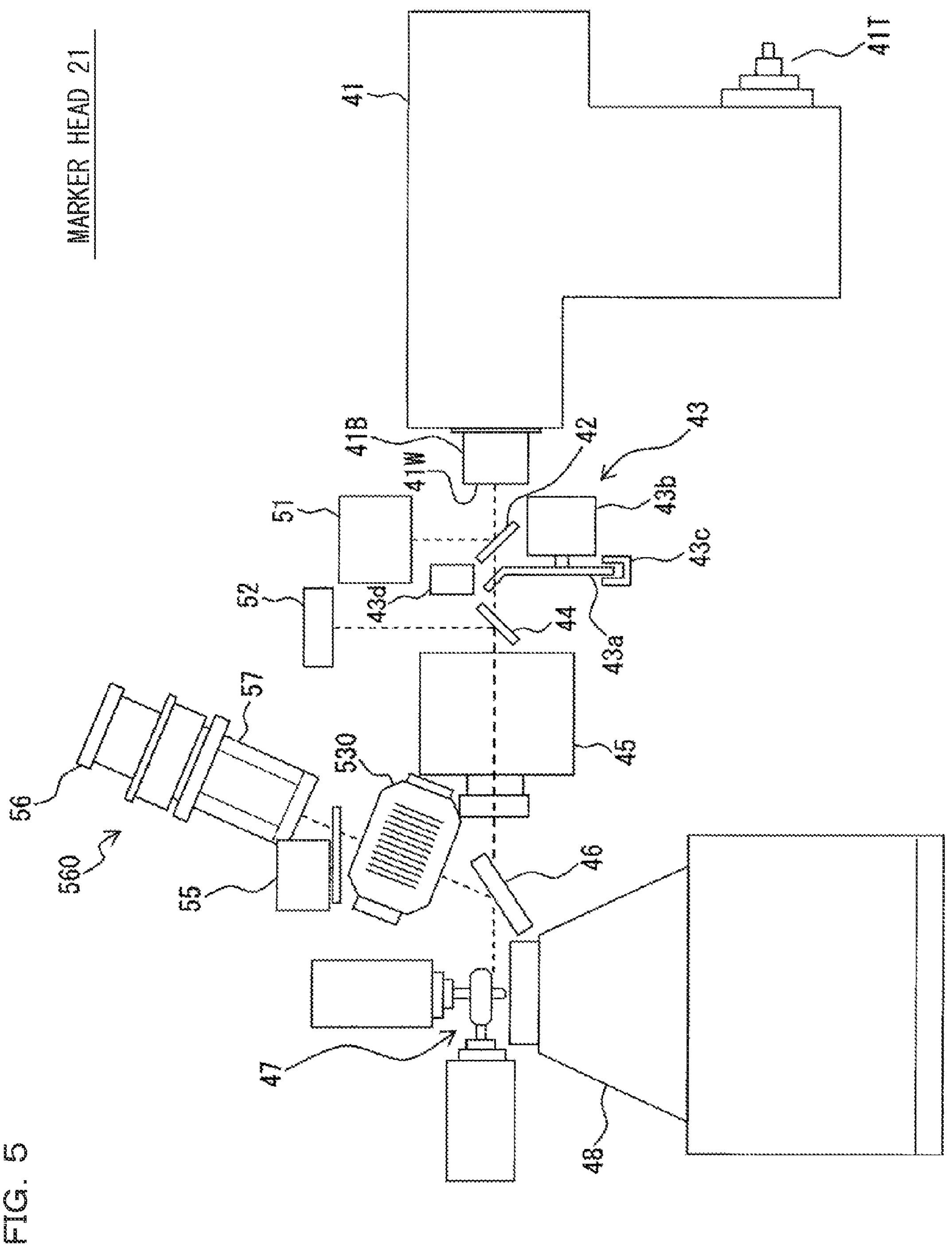
FIG. 5 is a view showing a spatial arrangement of the optical units of FIG. 2.

FIG. 5 is a view showing a spatial arrangement of the optical units 41 to 48, 51 to 56 of FIG. 2. The laser oscillator 41, the beam sampler 42, the mixing mirror 44, the Z scanner 45, the polarized beam splitter 46, and the XY scanner 47 are aligned and arranged in a substantially straight line in the horizontal direction, and the laser light L is passed through a straight path from the laser oscillator 41 to the XY scanner 47, bent downward by the XY scanner 47, and enters the telecentric lens 48. With such a configuration, the number of times the laser light is bent can be reduced so that error caused by the variation of the optical units 41 to 47 can be suppressed and the accuracy of laser processing can be enhanced.

The laser oscillator 41 is formed in a T-shape, where the excitation light is input from an input terminal 41T at the lower right, and the laser light L is output from an output window 41W formed at the distal end of an output tube 41B at the upper left.

The beam sampler 42 and the mixing mirror 44 are arranged inclined by 45° with respect to the emission axis of the laser light L.

The oscillator shutter 43 is configured by a light shielding plate 43*a*, a rotation drive unit 43*b*, a position detection unit 43*c*, and a reflected light absorbing device 43*d*. The light shielding plate 43*a* is a light shielding section for blocking the optical path of the laser light L, and is made from a metal plate, for example. The rotation drive unit 43*b* is a drive section for rotating the light shielding plate 43*a*, and a rotary solenoid is used, for example. When the rotation drive unit 43*b* rotates the light shielding plate 43*a*, the optical path of the laser light L can be blocked in an openable/closable manner. The position detection unit 43*c* is a detection section for detecting the rotation position of the light shielding plate 43*a*, and a photocoupler is used, for example. The reflected light absorbing device 43*d* absorbs the laser light L reflected by the light shielding plate 43*a* and prevents the laser light L from scattering.

The polarized beam splitter 46 is arranged inclined by about 56.6° with respect to the emission axis of the laser light L, and the incident angle of the laser light L is made to substantially coincide with a Brewster's angle. The laser light L thus can be transmitted almost 100%. The return light is reflected by the polarized beam splitter 46, and is directed upward with an angle of about 66.8° with respect to the emission axis of the laser light L in the horizontal direction.

An illumination module 530 is a module in which the illumination light source 53 is arranged on a near side in the plane of drawing and the half mirror 54 is arranged on a far side in the plane of drawing, where the illumination light emitted from the nearside toward the far side is reflected by the half mirror 54 and enters the polarized beam splitter 46 in the lower left direction. The return light that entered from the polarized beam splitter 46 is transmitted through the half mirror 54 and enters a camera module 560 in the upper right direction.

The camera module 560 is a module configured by the camera 56 and a lens barrel 57, where the camera 56 is attached in a replaceable manner with respect to the lens barrel 57.

<Internal Structure of Marker Head 21>

Figure 6:
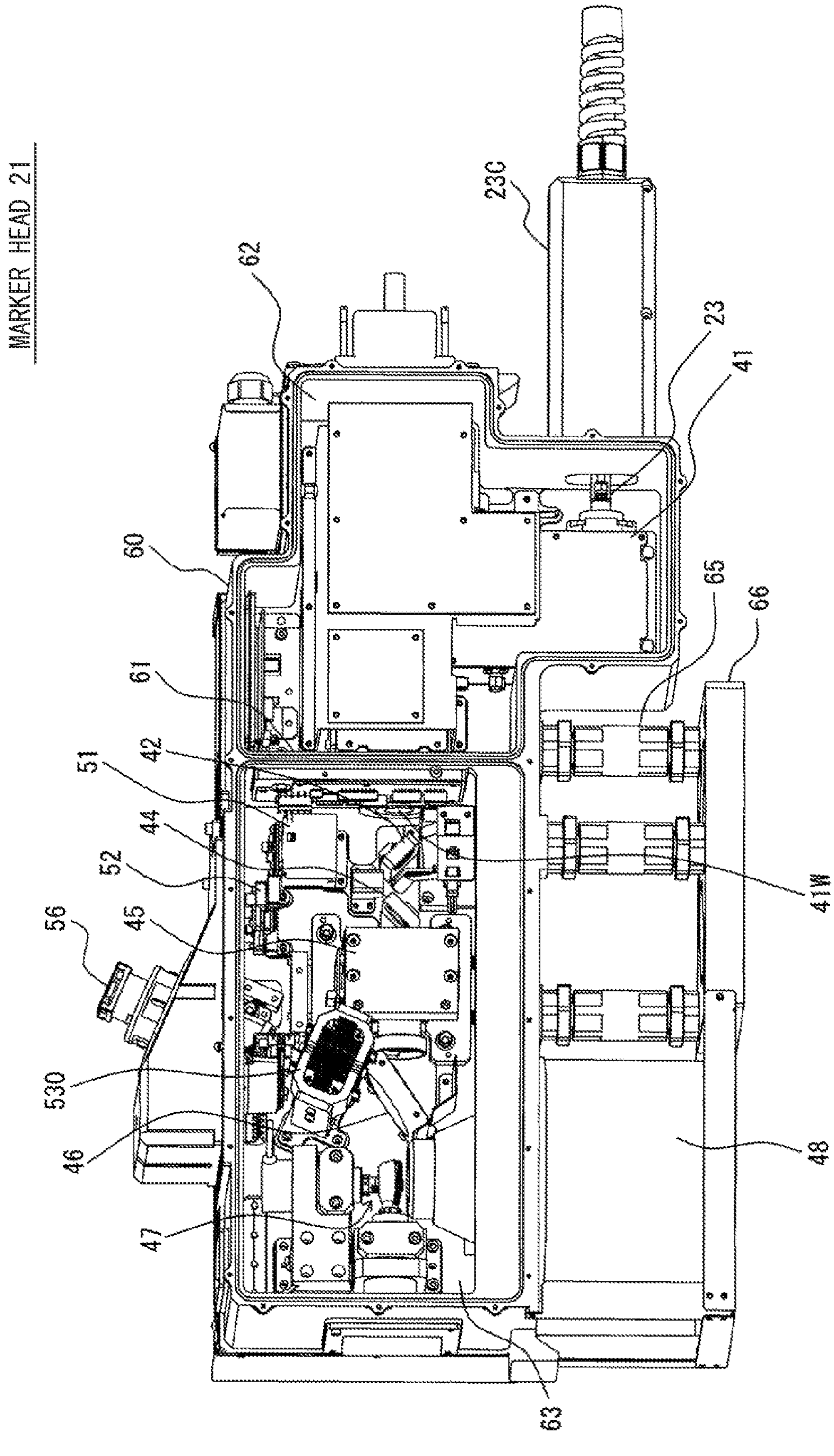
FIG. 6 is a perspective view showing an internal structure of a marker head of FIG. 1.

FIG. 6 is a perspective view showing an internal structure of the marker head 21 of FIG. 1. The marker head 21 has each optical unit excluding the telecentric lens 48 and the camera 56 of the optical units 41 to 48 and 51 to 56 shown in FIG. 2 accommodated in a housing frame 60.

The housing frame 60 is a frame integrally molded from a metal such as aluminum, and is divided into two accommodating portions 62, 63 by a partition plate 61 integrally molded therewith. By integrally molding the housing frame 60 and fixing each optical unit 41 to 48 and 51 to 56 in the housing frame 60, the arrangement accuracy of the optical units can be enhanced and the accuracy of the laser processing can be enhanced.

The accommodating portion 62 on the right side accommodates the laser oscillator 41, and has a connecting portion 231 of an optical fiber cable 230 attached to the outer wall so that the optical fiber 23 passes through the wall surface. The excitation light enters the lower right part of the laser oscillator 41 through the optical fiber 23, and the laser light L is emitted from the output window 41W at the upper left part of the laser oscillator 41. The output window 41W is arranged at the distal end of the output tube of the laser oscillator 41 passing through the partition plate 61, that is, the accommodating portion 63 on the left side.

The accommodating portion 63 on the left side accommodates each optical unit excluding the laser oscillator 41, the telecentric lens 48, and the camera 56. The accommodating portion 63 has a dustproof structure thus preventing lowering in the accuracy of the laser processing by the influence of dust.

Three height adjustment legs 65 for supporting the marker head 21 are attached to the housing frame 60. Each height adjustment leg 65 is a circular column shaped supporting member, and its length can be individually adjusted. Each height adjustment leg 65 is attached to a common attachment plate 66, and the marker head 21 is installed on a working table and the like by way of the attachment plate 66.

<Illumination Module 530>

Figure 7:
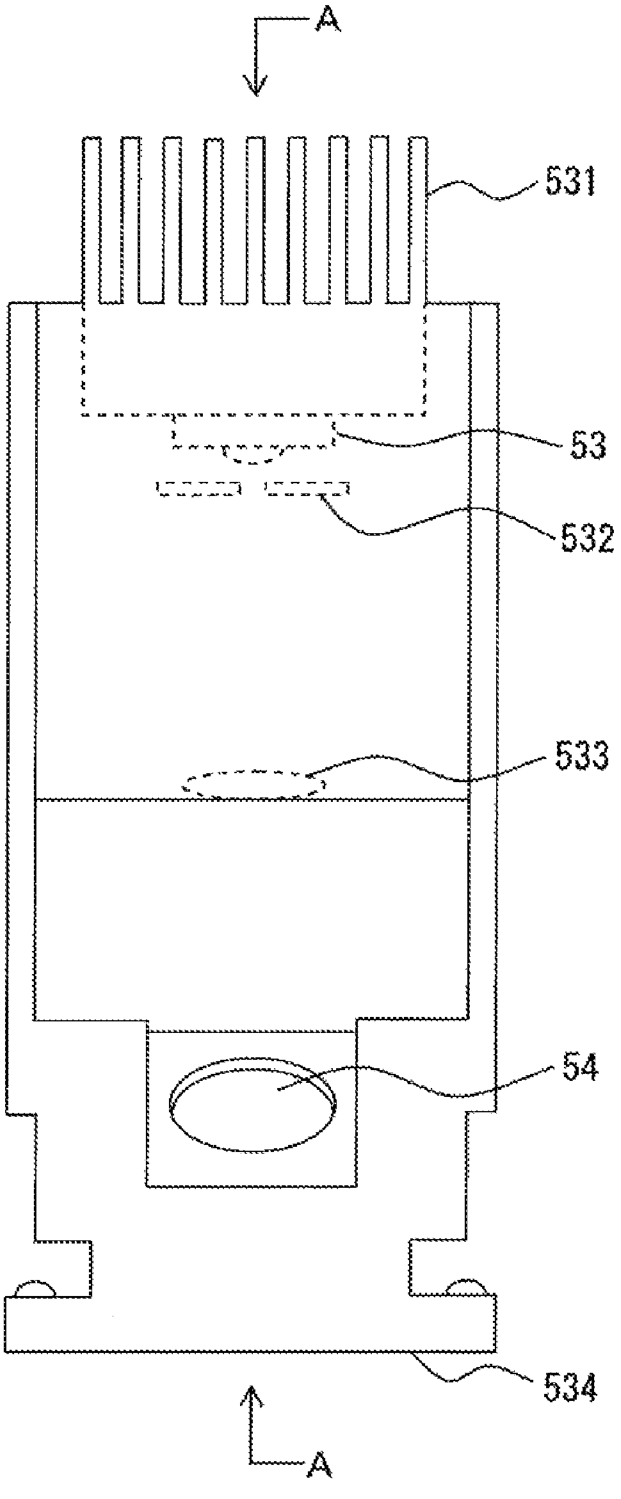
FIG. 7 is a plan view showing one configuration example of an illumination module of FIG. 5.
Figure 8:
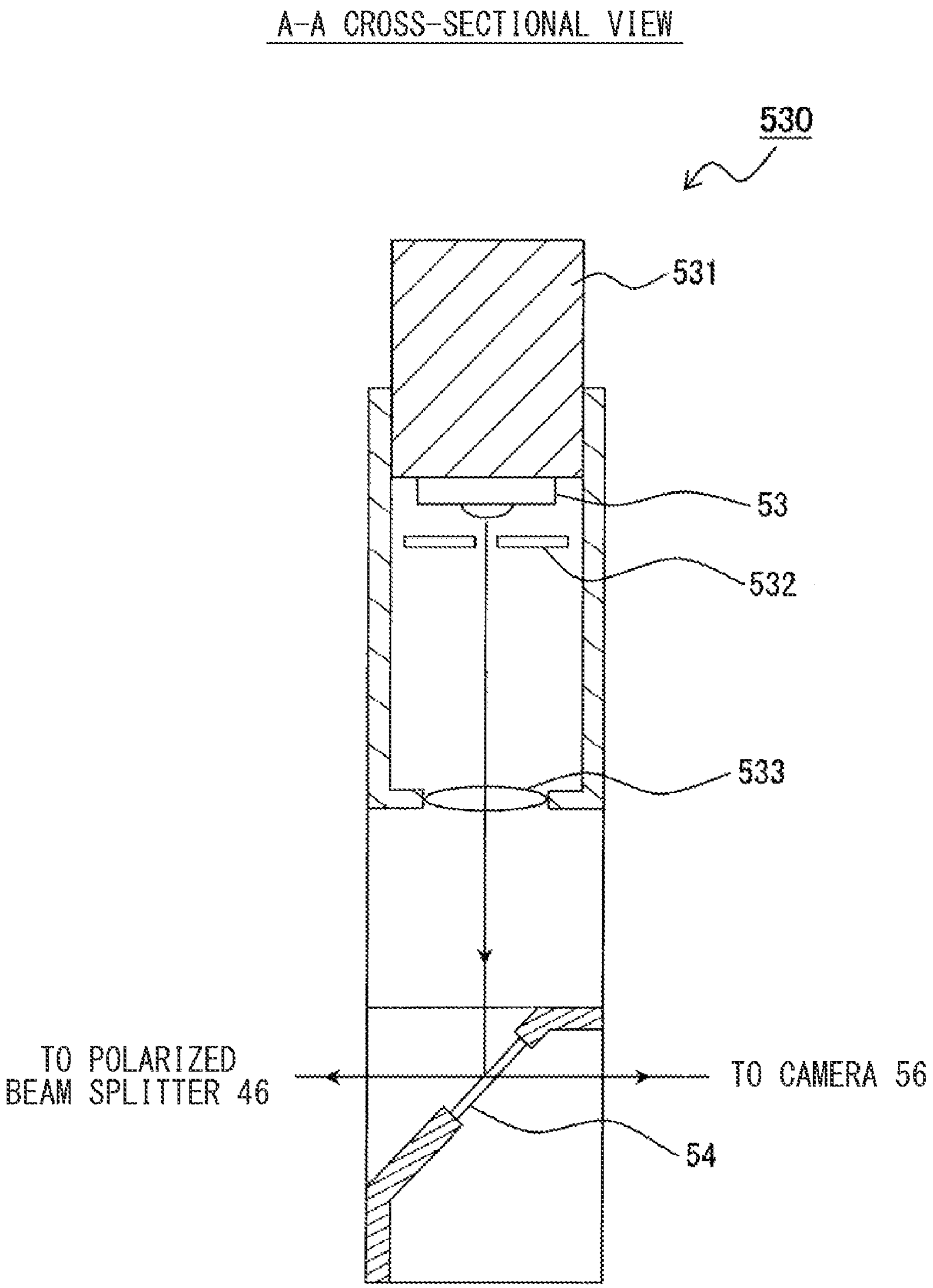
FIG. 8 is a cross-sectional view of the illumination module of FIG. 7 taken along line A-A.

FIG. 7 is a plan view showing one configuration example of the illumination module 530 of FIG. 5. FIG. 8 is a cross-sectional view of the illumination module 530 of FIG. 7 taken along line A-A. The illumination module 530 is configured by an illumination light source 53, a heat sink 531, an aperture 532, a light collecting lens 533, and a half mirror 54, where an attachment surface 534 is securely attached to the housing frame 60.

The heat sink 531 is a heat radiation plate having multiple heat radiation fins, and is attached to the rear surface of the illumination light source 53. The aperture 532 is an optical aperture that transmits only the illumination light in the vicinity of the emission axis, and includes a light shielding plate formed with a small transmitting window on the emission axis of the illumination light. The illumination light that transmitted through the aperture 532 passes through the light collecting lens 533 and enters the half mirror 54. The half mirror 54 is arranged inclined by 45° with respect to the light receiving axis of the camera 56.

By arranging the aperture 532 on the front side of the illumination light source 53, the light not necessary for photographing can be blocked and the light quantity of the irradiation light can be suppressed. Thus, lens flare can be suppressed from generating in the photographed image. In particular, the illumination light is suppressed from being reflected by the telecentric lens 48 thus generating the lens flare in the photographed image when the XY scanner 47 has a shallow scan angle.

<Camera Module 560>

Figure 9:
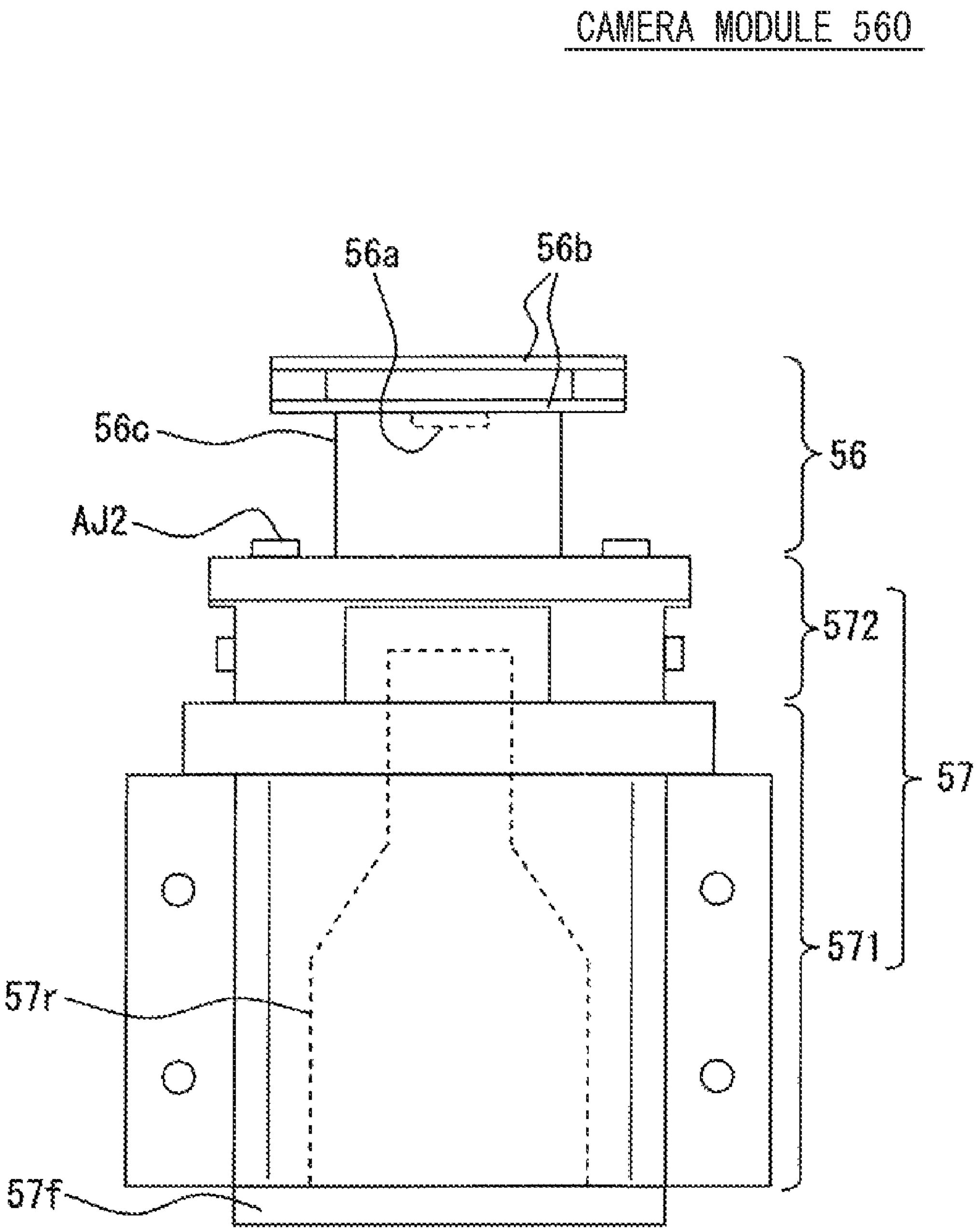
FIG. 9 is an outer appearance view showing one configuration example of a camera module of FIG. 5.

FIG. 9 is an outer appearance view showing one configuration example of the camera module 560 of FIG. 5. The camera module 560 includes the camera 56 and the lens barrel 57.

The camera 56 is a photographing unit including an imaging element 56*a*, a circuit substrate 56*b*, and a mount portion 56*c*. The imaging element 56*a* is an imaging section, in which multiple light receiving elements are arranged in a matrix form, for outputting a photographed image of the workpiece W, and a CCD (Charge Coupled Device) may be used, for example. The circuit substrate 56*b* is a print substrate arranged with the imaging element 56*a* and a control circuit thereof. The mount portion 56*c* is an engagement section for engaging the camera 56 with the lens barrel 57, and is securely attached to the circuit substrate 56*b*. Herein, the mount portion 56*c* is a cylindrical body having a thread groove formed on the inner surface, and configures a general-purpose screw-in mount such as a C mount.

The lens barrel 57 includes a barrel frame 571 and a camera attaching portion 572. The barrel frame 571 is a substantially tubular housing having one end facing the half mirror 54 and the camera attaching portion 572 arranged on the other end, and is securely attached to the housing frame 60. An image forming lens 57*r* accommodated in the lens barrel 57 is an optical system for causing the imaging element 56*a* to image the return light, and includes a wavelength selecting filter 57*f*.

The wavelength selecting filter 57*f* is a filter for selectively transmitting the wavelength substantially the same as at least the laser light L. A clear photographed image can be obtained by entering the return light having the wavelength substantially the same as the laser light L to the camera 56 and removing the wavelength component not necessary for photographing using the wavelength selecting filter 57*f*.

<Angle Adjustment Mechanism and Offset Adjustment Mechanism of Camera 56>

Figure 10A:
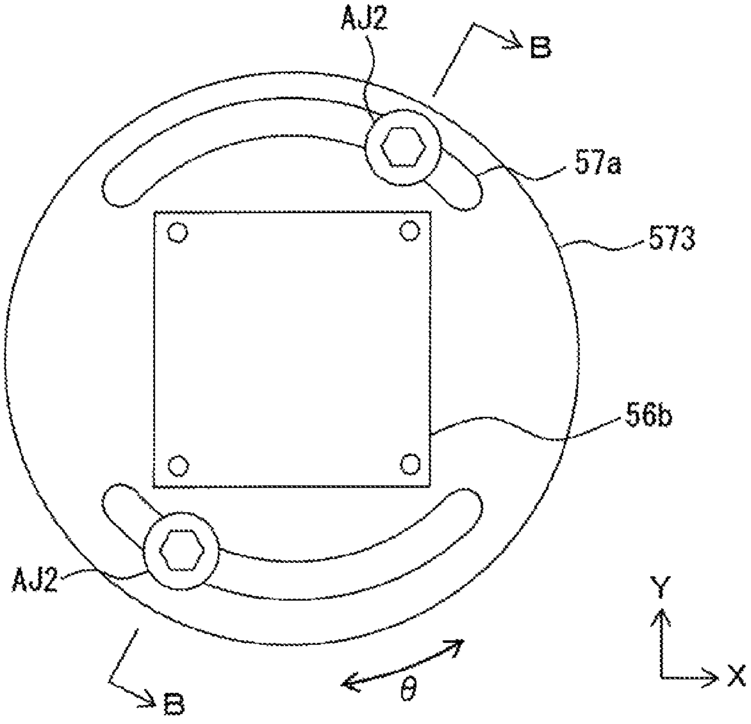
FIGS. 10A and 10B are views showing a detailed configuration of a camera and a camera attaching portion of FIG. 9.
Figure 10B:
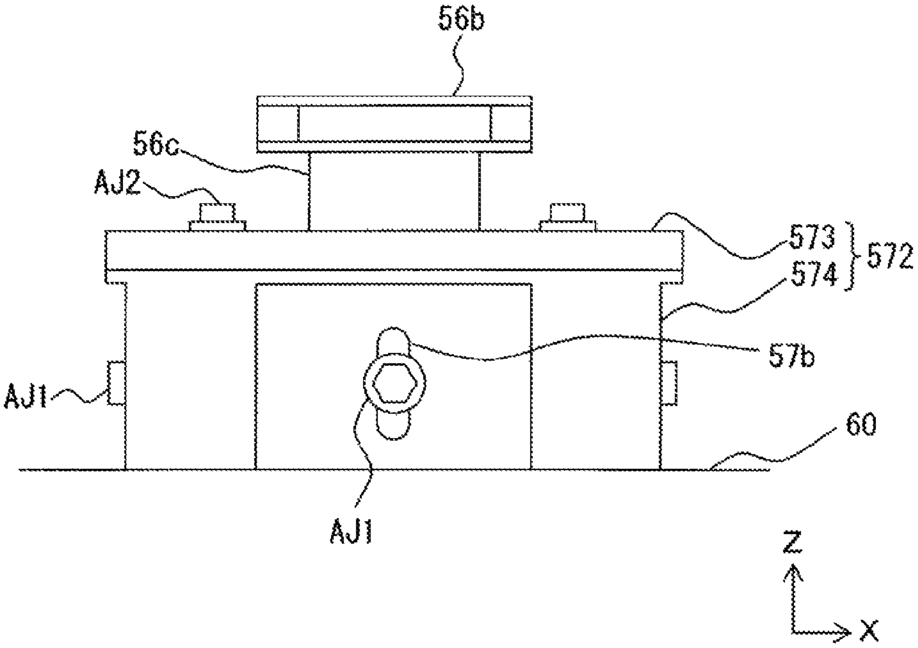
Figure 11:
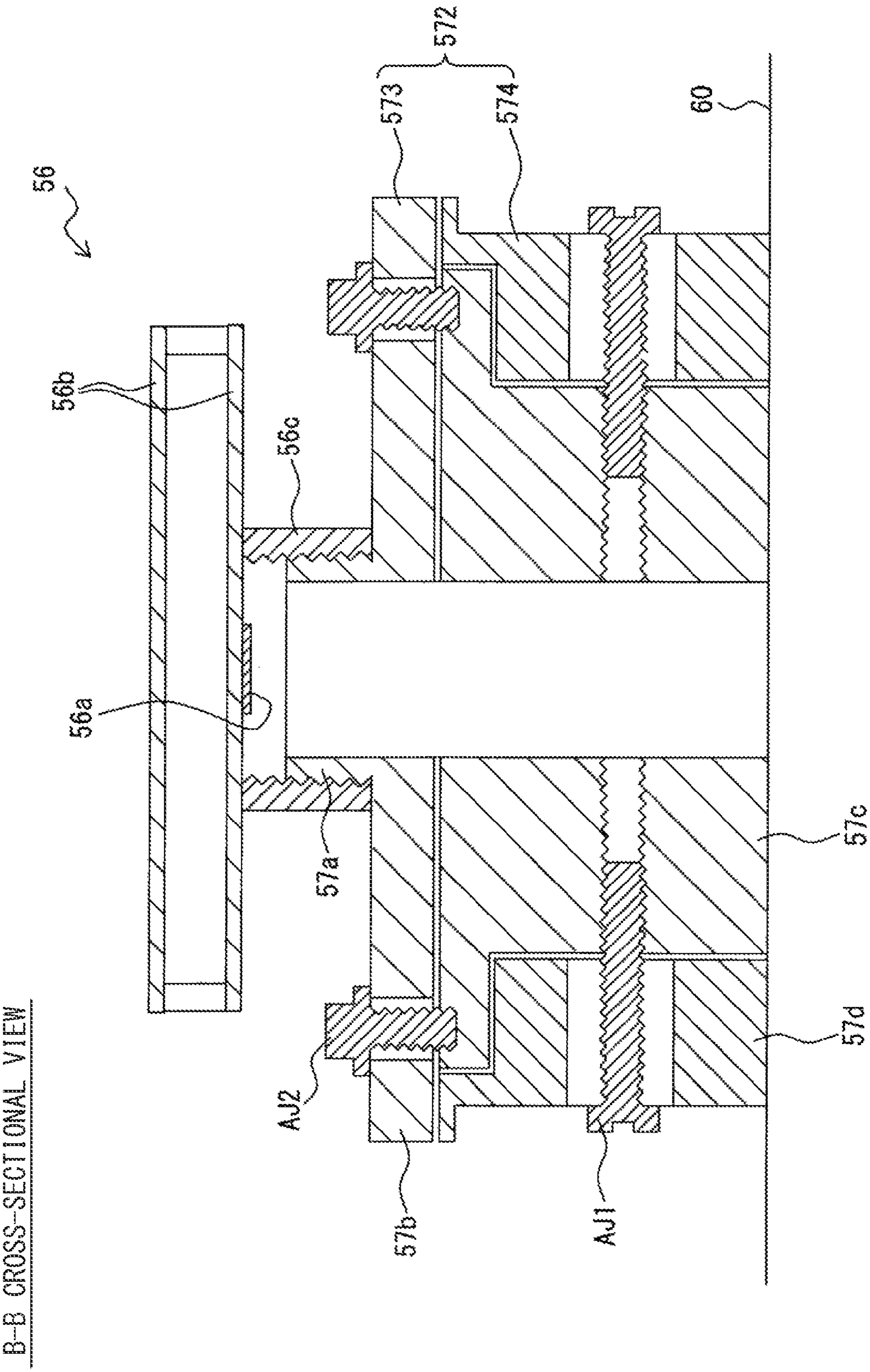
FIG. 11 is a cross-sectional view of the camera and the camera attaching portion of FIG. 9 taken along line B-B.

FIGS. 10A and 10B are views showing a detailed configuration of the camera 56 and the camera attaching portion 572 of FIG. 9, where FIG. 10A is a view seen from the light receiving axis (the camera 56 side), and FIG. 10B is a view seen from a direction orthogonal to the light receiving axis. FIG. 11 is a cross-sectional view of the camera 56 and the camera attaching portion 572 of FIG. 9 taken along line B-B.

The camera attaching portion 572 is a camera mount including a movable mounting part 573 and a mount supporting part 574, and is removably attached with the camera 56. The camera attaching portion 572 can adjust the attachment position of the camera 56. The camera 56 is arranged on the outside of the housing frame 60 by the camera attaching portion 572.

The movable mounting part 573 is an engagement section that engages with the camera 56, and is supported by the mount supporting part 574. The movable mounting part 573 includes a cylindrical body 57*a* and a disc-like flange 57*b* arranged with their center axes coincided with each other. The mount supporting part 574 includes an inner tubular body 57*c* formed with a through-hole including the light receiving axis of the camera 56 and an outer tubular body 57*d* for accommodating the inner tubular body 57*c*.

The movable mounting part 573 is attached to the mount supporting part 574 with the flange 57*b* in contact with the upper end face of the mount supporting part 574. The cylindrical body 57*a* projecting upward from the flange 57*b* has a thread groove formed on the outer circumferential surface thereof, and configures a screw-in mount that engages with the camera 56, for example, the C mount. That is, the camera 56 is removably attached to the camera attaching portion 572 by screw-fitting the mount portion 56*c* to the movable mounting part 573.

The movable mounting part 573 is fixed using six adjustment screws AJ1, AJ2. The four adjustment screws AJ1 are adjustment sections for adjusting the position of the light receiving axis on the imaging element 56*a*. The two adjustment screws AJ2 are adjustment sections for adjusting the direction of the imaging element 56*a* with the light receiving axis as the center.

The four adjustment screws AJ1 are respectively arranged to be orthogonal to the optical axis, and such that the adjacent adjustment screws AJ1 form a right angle. The adjustment screw passes through a long hole 57*b* extending in the Z direction formed in the outer tubular body 57*d* of the mount supporting part 574 from the outer side to be screw-fit with the inner tubular body 57*c*. Therefore, by turning the adjustment screws AJ1, the movable mounting part 573 can be moved two-dimensionally and the position of the light receiving axis on the imaging element 56*a* can be moved in the XY direction (FIG. 10). Furthermore, by loosening the adjustment screw AJ1 and adjusting the position, the movable mounting part 573 can be moved in the Z direction (optical axis direction) and the distance between the imaging element 56*a* and the image forming lens 57*r* can be finely adjusted in the Z direction. The offset adjustment range in the X direction and the Y direction is about 1 to 2 mm.

The two adjustment screws AJ2 are both arranged to be in parallel with the optical axis, and pass through an arcuate long hole 57*a* extending along the outer periphery of the flange 57*b* of the movable mounting part 573 from the outer side to be screwed into the upper end face of the inner tubular body 57*c* of the mount supporting part 574. Thus, by loosening the adjustment screws AJ2 and rotating the movable mounting part 573, the direction (attachment angle θ) of the imaging element 56*a* can be adjusted with the optical axis as the center. The adjustment range of the attachment angle θ is about 90°.

Figure 12A:
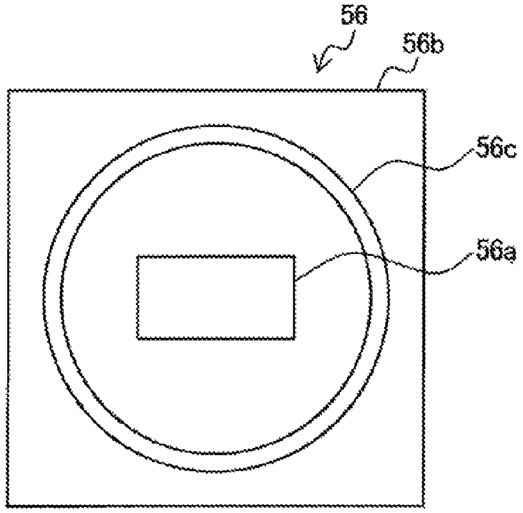
FIGS. 12A to 12C are explanatory views showing variations in a position of an imaging element and an attachment angle of the camera in the camera module of FIG. 9.
Figure 12B:
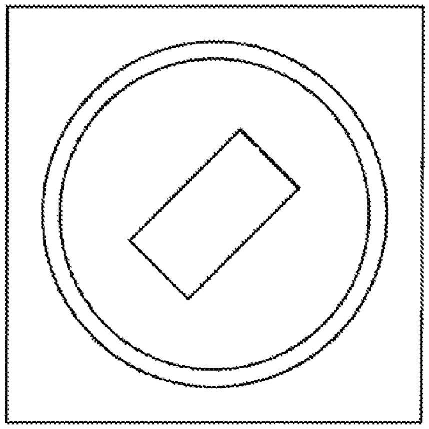
Figure 12C:
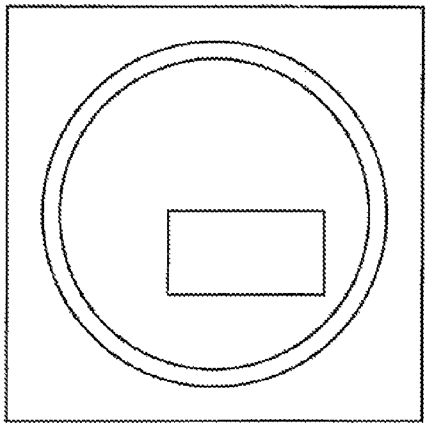

FIGS. 12A to 12C are explanatory views showing the variations in the position of the imaging element 56*a* and the attachment angle of the camera 56 in the camera module 560 of FIG. 9. FIG. 12A shows a normal case, FIG. 12B shows a case where the attachment angle of the camera 56 is shifted, and FIG. 12C shows a case where the position of the imaging element 56*a* is shifted.

The camera 56 is fixed to the camera attaching portion 572 by screw-fitting the camera attaching portion 572 into the mount portion 56*c*. Thus, the attachment angle of the camera 56 varies depending on the processing state of the thread groove and the screw thread. The camera attaching portion 572 can correct the attachment angle of the camera 56 with the angle adjustment mechanism described above even if the attachment angle of the camera 56 is shifted.

It is not easy to make the position of the imaging element 56*a* of the circuit substrate 56*b* coincide with the center axis of the mount portion 56*c* in the camera 56. The position of the imaging element 56*a* with respect to the mount portion 56*c* thus varies. The camera attaching portion 572 can correct the position of the imaging element 56*a* with respect to the mount portion 56*c* with the offset adjustment mechanism described above even if the position of the imaging element 56*a* is shifted.

<Attachment Structure of Camera Cover 70>

Figure 13:
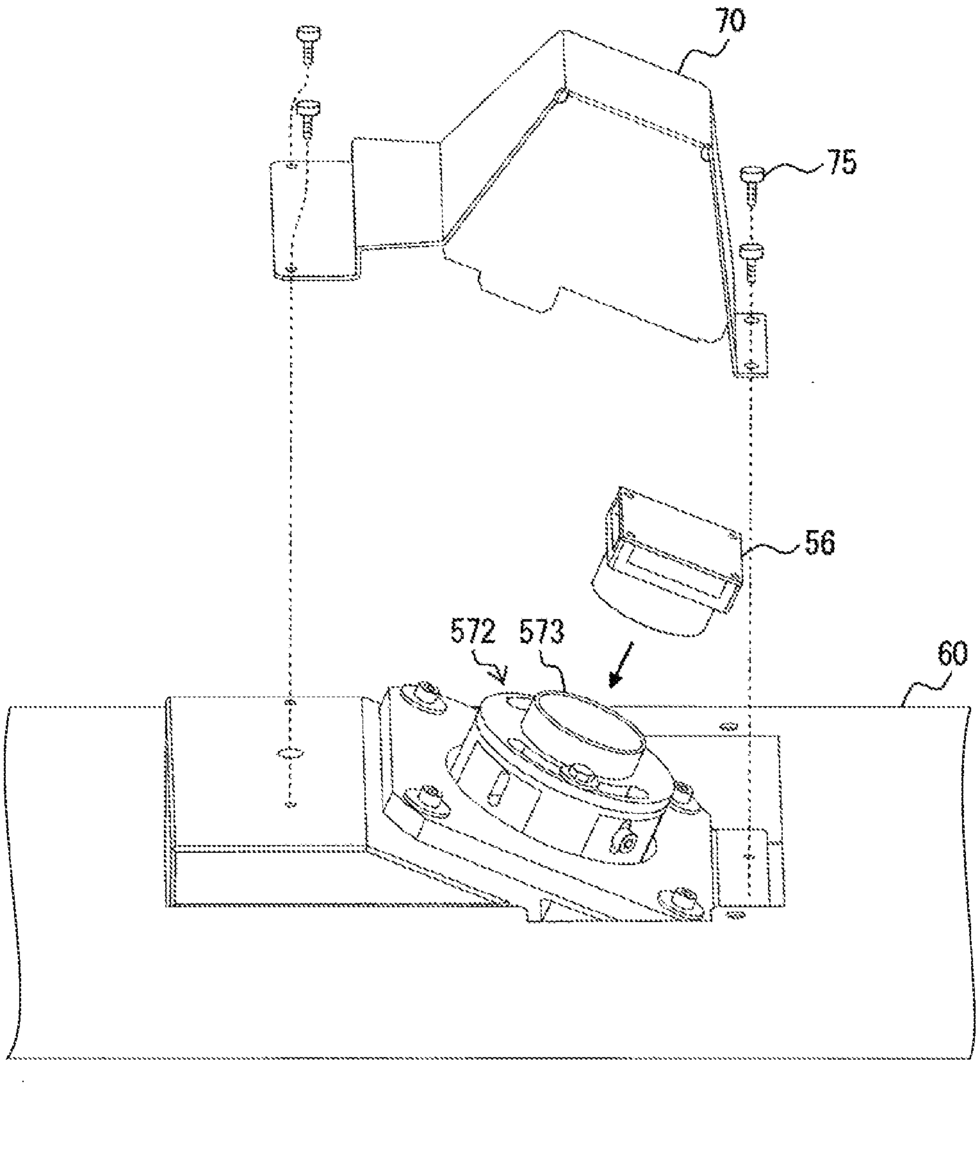
FIG. 13 is a perspective view showing an attachment structure of a camera cover in the marker head of FIG. 1.

FIG. 13 is a perspective view showing an attachment structure of a camera cover 70 in the marker head 21 of FIG. 1. The camera 56 is fixed by being screw-fitted to the movable mounting part 573 of the camera attaching portion 572 fixed with respect to the housing frame 60.

The camera cover 70 for covering the camera 56 so that the camera 56 attached to the movable mounting part 573 is not exposed is attached to the laser marker 20. The camera cover 70 is removably attached to the housing frame 60. In this example, the camera cover 70 is fixed to the housing frame 60 by a cover attachment screw 75.

When the camera 56 is detached from the movable mounting part 573, the laser light L may leak out from the opening of the camera attaching portion 572 as the return light from the workpiece W or the scattered light by the emission optical system, the XY scanner 47, or the like. In this laser marker 20, in order to prevent leakage of the laser light L, the output of the laser light L is stopped when the camera cover 70 is detached from the housing frame 60.

<Camera Cover 70>

Figure 14A:
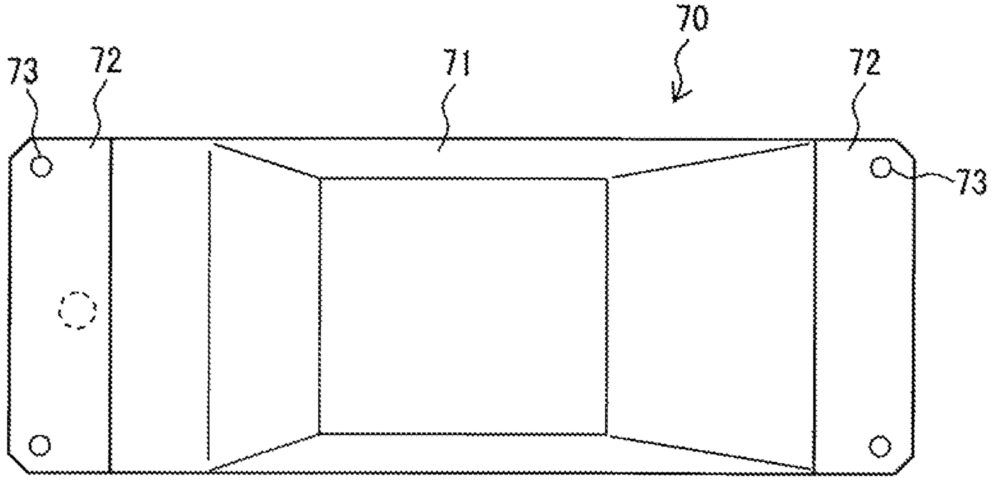
FIGS. 14A and 14B are views showing a configuration example of the camera cover of FIG. 13.
Figure 14B:
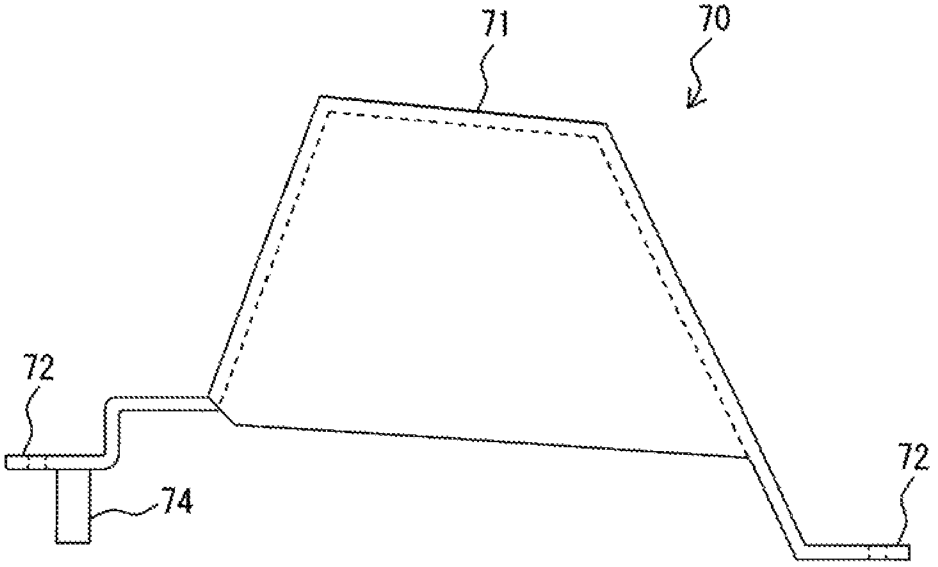

FIGS. 14A and 14B are views showing a detailed configuration of the camera cover 70 of FIG. 13. FIG. 14A is a plan view of the camera cover 70, and FIG. 14B is a side view of the camera cover 70. The camera cover 70 is formed by performing bending processing and the like on a flat plate made from a light shielding member such as metal, and includes a camera accommodating portion 71 for accommodating the camera 56 and an attachment surface 72 to be fixed to the housing frame 60.

The attachment surface 72 is formed with a screw hole 73 and a pushing element 74. The camera cover 70 is fixed by screw-fitting the cover attachment screw 75 to the housing frame 60 by way of the screw hole 73. The pushing element 74 is an operation body for opening and closing a limit SW (switch) 80 for detecting the attachment and detachment of the camera cover 70, and is a columnar body projecting out from the attachment surface 72.

<Limit SW 80>

Figure 15A:
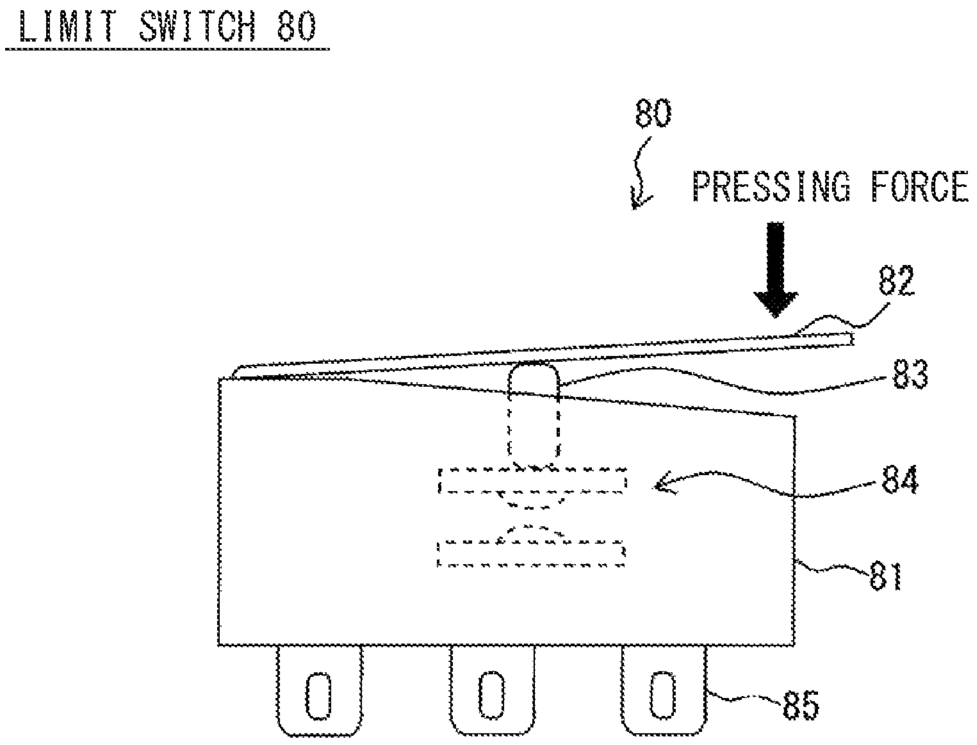
FIGS. 15A and 15B are views showing a configuration example of a limit SW in the marker head of FIG. 13.
Figure 15B:
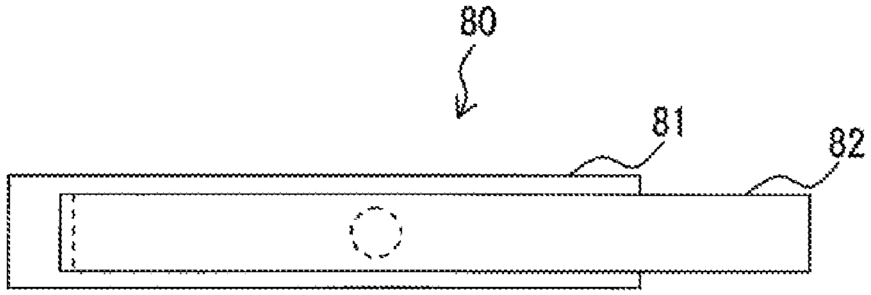

FIGS. 15A and 15B are views showing a configuration example of the limit SW 80 in the marker head 21 of FIG. 13. FIG. 15A is a side view of the limit SW 80, and FIG. 15B shows a state of the limit SW 80 seen from above. The limit SW 80 is a cover attachment/detachment detection section for detecting the detachment of the camera cover 70 from the housing frame 60, and includes a main body 81, a spring piece 82, and a pushing element 83.

The main body 81 has a mechanical contact 84 including two terminal electrodes arranged facing each other, and is arranged in the housing frame 60. The mechanical contact 84 shifts to the conducting state by the pushing element 83 that moves downward by pushing a distal end of the spring piece 82, and shifts to the blocking state by releasing the spring piece 82.

The limit SW 80 shifts to the conducting state when the camera cover 70 is attached to the housing frame 60 thus bringing the pushing element 74 into contact with the spring piece 82 and pushing the spring piece 82. On the other hand, the limit SW 80 shifts to the blocking state when the camera cover 70 is detached from the housing frame 60 thus releasing the spring piece 82. A detection signal of the attachment or detachment of the camera cover 70 is output to the marker controller 22 through the terminal electrode 85.

Figure 16:
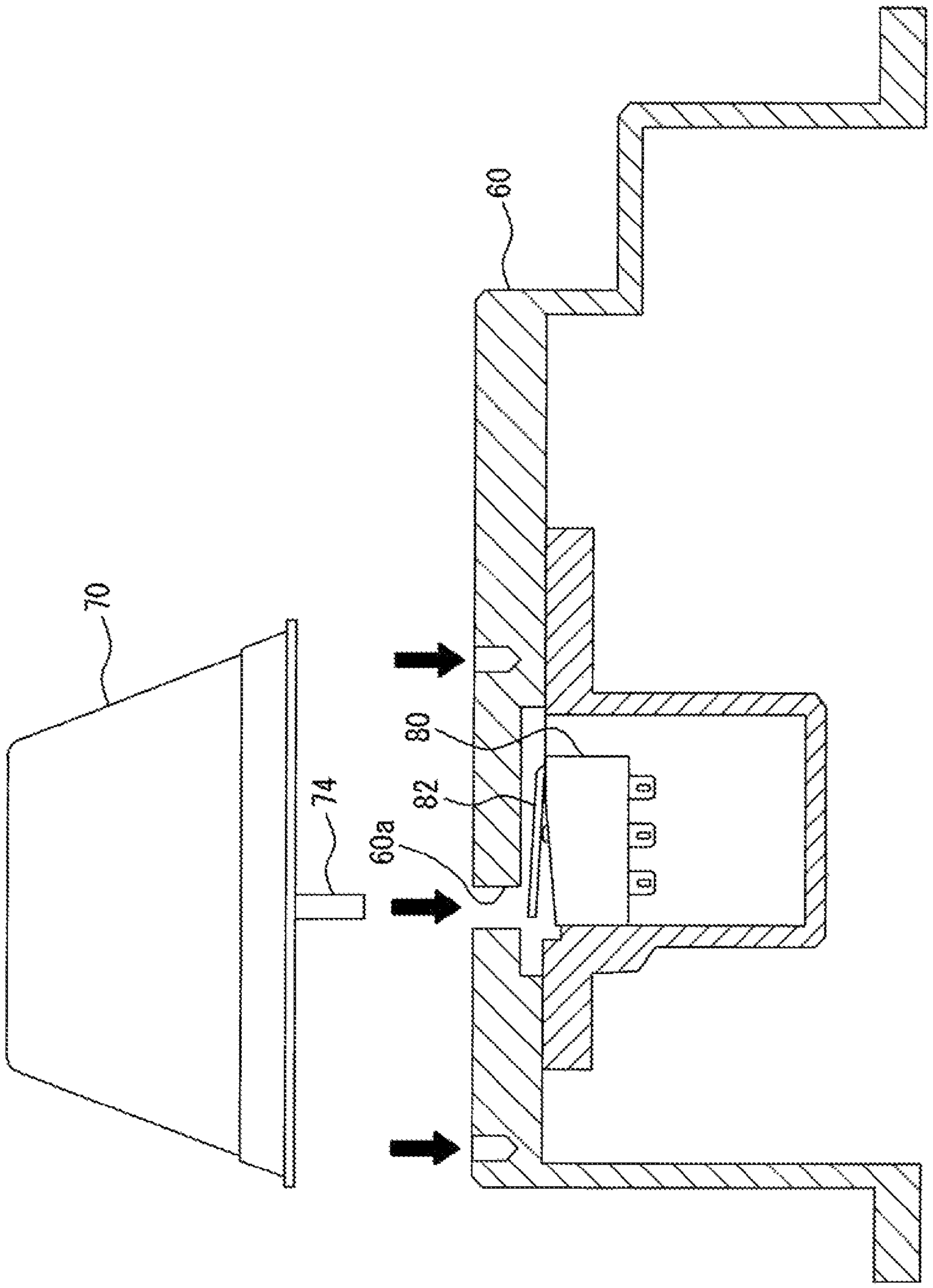
FIG. 16 is a view showing a state at the time of attachment of the camera cover in the marker head of FIG. 13.

FIG. 16 is a view showing a state at the time of the attachment of the camera cover 70 in the marker head 21 of FIG. 13, and shows a cross-sectional view taken along the perpendicular plane of the marker head 21. The camera cover 70 is attached with respect to the housing frame 60 so as to cover the camera 56 from the upper side. In this case, the pushing element 74 of the camera cover 70 is brought into contact with the spring piece 82 of the limit SW 80 through a through-hole 60*a* of the housing frame 60, thus elastically deforming the spring piece 82 downward.

The limit SW 80 shifts to the conducting state by attachment of the camera cover 70 to the housing frame 60, and shifts to the blocking state by detachment of the camera cover 70 from the housing frame 60.

<Marker Controller 22>

Figure 17:
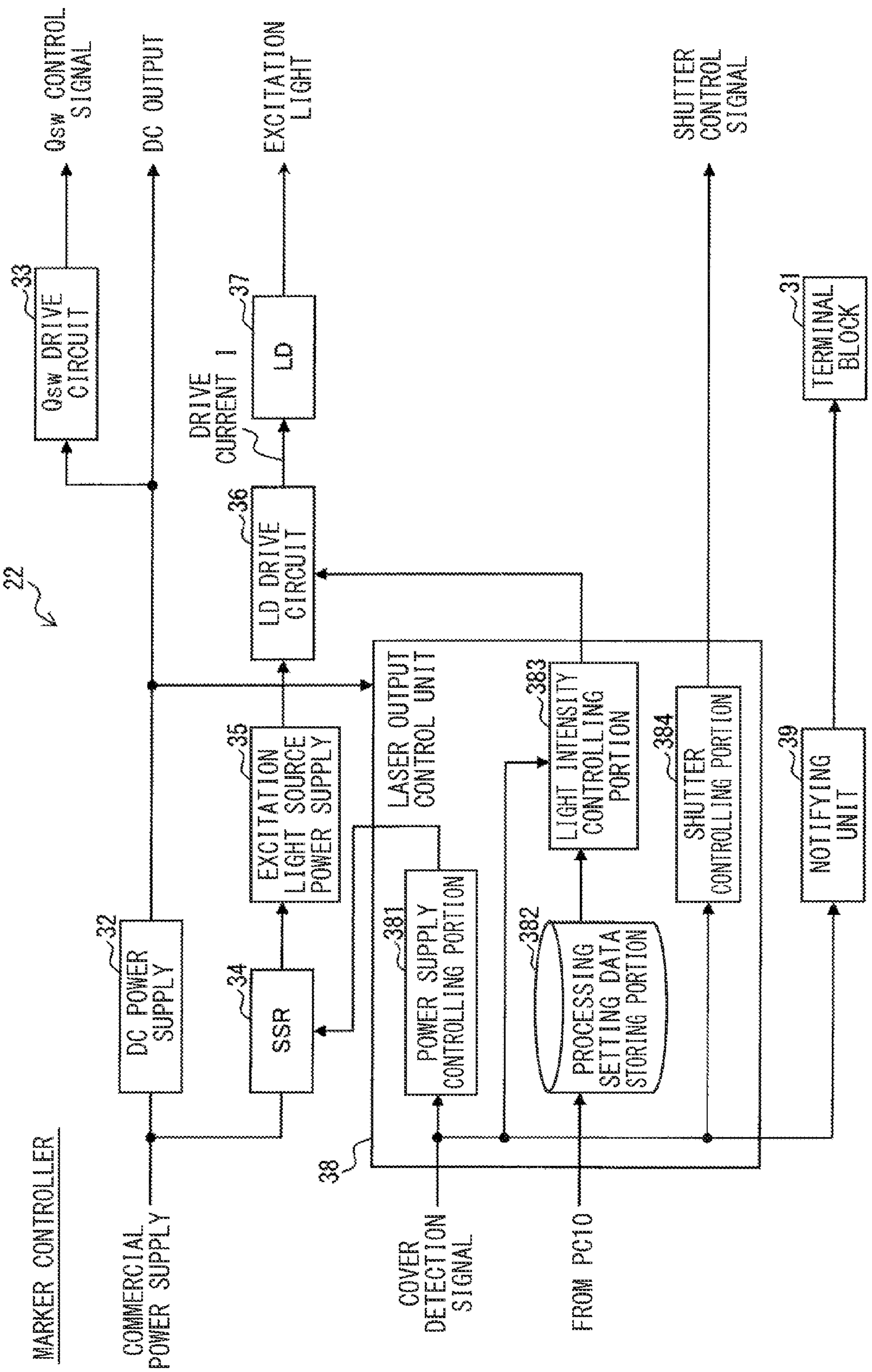
FIG. 17 is a block diagram showing a configuration example of the marker controller in the laser marker of FIG. 2.

FIG. 17 is a block diagram showing a configuration example of the marker controller 22 in the laser marker 20 of FIG. 2. The marker controller 22 is configured by a terminal block 31, a DC power supply 32, a Q switch drive circuit 33, an SSR 34, an excitation light source power supply 35, an LD drive circuit 36, an LD 37, a laser output control unit 38, and a notifying unit 39.

The DC power supply 32 is a power supply device for converting the alternating current supplied from a commercial power supply to the direct current, and supplying power to the marker head 21, the Q switch drive circuit 33, and the laser output control unit 38. The Q switch drive circuit 33 is a driver circuit for driving a Q switch in the laser oscillator 41, and outputs a predetermined Qsw control signal for instructing the oscillation frequency, the pulse width, and the like to the Q switch.

The SSR (Solid State Relay) 34 is a relay circuit for blocking the power supply with respect to the excitation light source power supply 35 or releasing the blocking state and resuming the power supply based on a relay control signal from the laser output control unit 38, and is constituted by a semiconductor element.

The excitation light source power supply 35 is a power supply device for supplying power to the LD drive circuit 36 using the commercial power supply supplied through the SSR 34. The LD drive circuit 36 and the LD (Laser Diode) 37 are excitation light sources for generating the excitation light for laser oscillation. The LD 37 is a light emitting element for generating the laser light as the excitation light, and is constituted by a semiconductor element. The LD drive circuit 36 supplies a drive current I to the LD 37.

The laser output control unit 38 includes a power supply controlling portion 381, a processing setting data storing portion 382, a light intensity controlling portion 383, and a shutter controlling portion 384, and carries out the output control of the laser light L. The laser output control unit 38 prohibits the laser light L from being emitted toward the workpiece W based on the cover detection signal from the limit SW 80. That is, the laser output control unit 38 functions as a cover attachment/detachment determination section for determining whether or not the camera cover 70 is detached, and prohibits the emission of the laser light L when determined that the camera cover 70 is detached. Specifically, the emission of the laser light L to the workpiece W is prohibited by stopping the laser oscillation, controlling the Q switch, or closing the oscillator shutter 43.

The processing setting data storing portion 382 holds the processing setting data transferred from the terminal device 10. The light intensity controlling portion 383 controls the Q switch drive circuit 33 and the LD drive circuit 36 based on the processing setting data in the processing setting data storing portion 382 to carry out the output adjustment of the laser light L.

The power supply controlling portion 381 generates a predetermined relay control signal for controlling the power supply with respect to the excitation light source power supply 35 based on the cover detection signal from the limit SW 80, and outputs the same to the SSR 34. Specifically, if it is detected that the camera cover 70 is detached from the housing frame 60 by the limit SW 80, the power supply with respect to the excitation light source power supply 35 is blocked. On the other hand, if it is detected that the camera cover 70 is attached to the housing frame 60, the power supply with respect to the excitation light source power supply 35 is resumed.

The light intensity controlling portion 383 instructs the current value of the drive current I with respect to the LD drive circuit 36 based on the cover detection signal from the limit SW 80. Specifically, if it is detected that the camera cover 70 is detached from the housing frame 60 by the limit SW 80, the current value=0 of the drive current I is instructed with respect to the LD drive circuit 36 to shift to the laser output stop state. That is, even during the irradiation period of the laser light L, the output of the excitation light is stopped when the camera cover 70 is detached. If it is detected that the camera cover 70 is attached to the housing frame 60, the laser output stop state is released.

The shutter controlling portion 384 generates a predetermined shutter control signal for controlling the oscillator shutter 43 and the camera shutter 55 based on the cover detection signal from the limit SW 80. Specifically, if it is detected that the camera cover 70 is detached from the housing frame 60 by the limit SW 80, the oscillator shutter 43 and the camera shutter 55 are closed to shift to the laser output stop state. That is, even during the irradiation period of the laser light L, the emission path of the laser light L is blocked when the camera cover 70 is detached.

Furthermore, even if the camera 56 is mistakenly detached at the time of the camera photographing, the light receiving path of the camera 56 is blocked by the camera shutter 55. On the other hand, if it is detected that the camera cover 70 is attached to the housing frame 60, the laser output stop state can be released. For example, the stop state of the laser output can be released by once turning OFF the main power supply and again turning ON the power supply.

The notifying unit 39 notifies that the camera cover 70 is detached from the housing frame 60 based on the cover detection signal from the limit SW 80. Specifically, if it is detected that the camera cover 70 is detached from the housing frame 60 by the limit SW 80, a warning signal indicating that the camera cover 70 is not attached is output with respect to the external device connected to the terminal block 31 or the console connected to the marker controller 22.

<Power Supply Controlling Portion 381>

Figure 18:
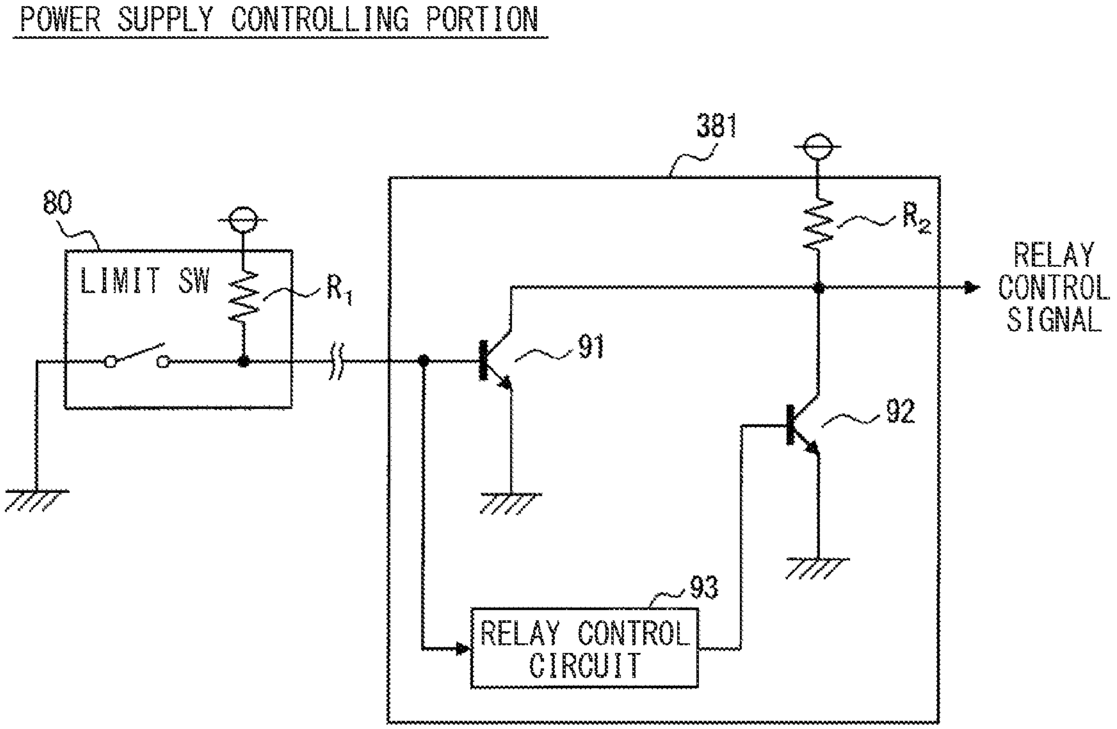
FIG. 18 is a view showing a configuration example of a power supply controlling portion in the laser output control unit of FIG. 17.

FIG. 18 is a view showing a configuration example of the power supply controlling portion 381 of the laser output control unit 38 of FIG. 17. The output of the limit SW 80 pulled up through a resistor element $R_1$ is supplied to the power supply controlling portion 381. The output of the limit SW 80 is the cover detection signal which voltage level becomes low level at the time of conduction of the mechanical contact 84 and becomes high level at the time of release.

The power supply controlling portion 381 includes two transistors 91, 92, a pull-up resistor $R_2$, and a relay control circuit 93, and outputs the relay control signal of low level when the voltage level of the input signal is high level to turn OFF the SSR 34.

The transistors 91, 92 have the respective collector terminal connected to a common output terminal, and receive the DC power supply through the pull-up resistor $R_2$. The emitter terminals are both grounded. The input signal is provided to the base terminal of the transistor 91 and the relay control circuit 93. The output of the relay control circuit 93 is provided to the base terminal of the transistor 92.

The relay control circuit 93 is an electronic circuit for controlling opening/closing of the transistor 92 based on the cover detection signal. Specifically, the low level is output when the voltage level of the input signal is low level and the high level is output when the input level is high level to turn ON the transistor 92. Such a relay control circuit 93 may be configured in terms of hardware using a FPGA (Field Programmable Gate Array). The FPGA is a semiconductor device including a programmable logical circuit. The relay control circuit 93 may be configured in terms of software by operating a processor by a predetermined application program.

The relay control signal is output as a logical sum of the transistors 91, 92, and is switched from the high level to the low level when at least one of the transistors 91, 92 is turned ON. According to such a configuration, the SSR 34 can be correctly turned OFF even if any one of the transistor 91 and the relay control circuit 93 breaks down, or the relay control circuit 93 runs out of control.

Figure 19:
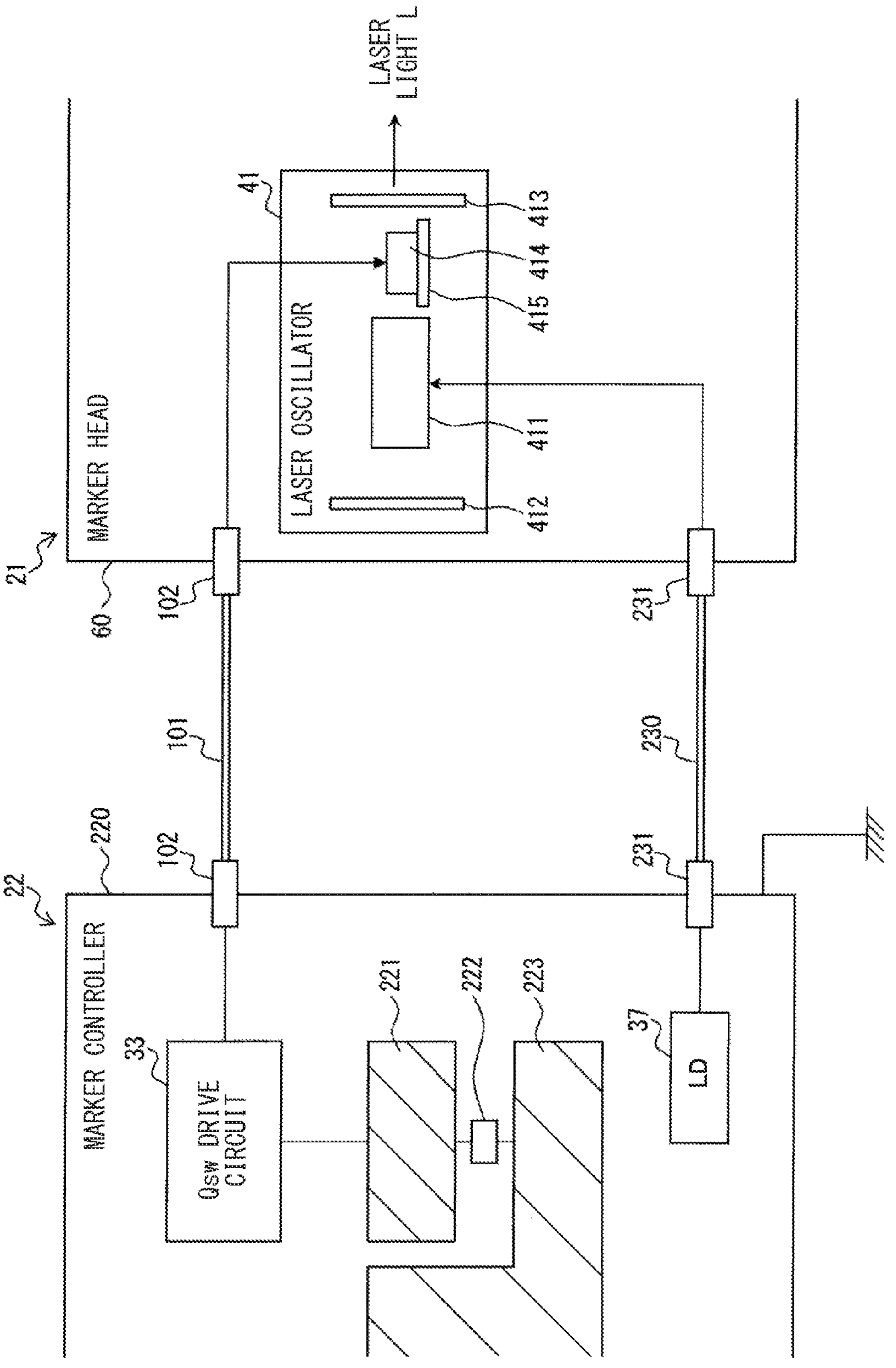
FIG. 19 is an explanatory view schematically showing a drive system of a Q switch in the laser marker of FIG. 2.

FIG. 19 is an explanatory view schematically showing a drive system of a Q switch 414 in the laser marker 20 of FIG. 2. A high voltage is necessary for driving the Q switch 414 in the laser oscillator 41. The laser marker 20 according to the present embodiment includes a protective mechanism for protecting other circuits and components from the high voltage of such a Q switch and the drive system thereof and for preventing electrification.

The laser oscillator 41 includes a laser medium 411, resonance mirrors 412, 413, the Q switch 414 and a heat radiation plate 415. The laser medium 411 is excited by the excitation light transmitted from the marker controller 22 through the optical fiber 23 of the optical fiber cable 230, and amplifies the laser light L by induced radiation. The laser medium 411 is arranged between the resonance mirrors 412 and 413. The laser light L is amplified every time it passes the laser medium 411.

The Q switch 414 is an optical element for obtaining the laser pulse of high energy density by changing the Q value, and operates based on the Qsw control signal transmitted from the marker controller 22 through a signal transmission cable 101. The Q switch 414 includes an electro-optical element capable of adjusting the transmitted light quantity by application voltage using birefringence, and is arranged between the laser medium 411 and the resonance mirror (output mirror) 413. The Q switch 414 is fixed to the housing frame 60 through the heat radiation plate 415 and the like.

The signal transmission cable 101 is a wire cable for transmitting the Qsw control signal, and includes a coaxial cable, for example. The signal transmission cable 101 has one end attached to the housing frame 60 of the marker head 21 through a connecting unit 102, and the other end attached to a controller housing 220 of the marker controller 22 through the connecting unit 102.

The optical fiber cable 230 is a cable including the optical fiber 23 for transmitting the excitation light. The optical fiber 23 is shielded by a conductive metal or the like. Similarly to the signal transmission cable 101, the optical fiber cable 230 also has one end attached to the housing frame 60 through a connecting unit 231, and the other end attached to the controller housing 220 through the connecting unit 231.

The connecting unit 102 of the signal transmission cable 101 includes a BNC (Bayonet Neill Concelman) connector having a predetermined lock mechanism, and cannot be detached. The housing frame 60 is grounded through the metal shield of the optical fiber cable 230 and the controller housing 220.

The Q switch drive circuit 33 generates the high voltage as the Qsw control signal. Thus, the circuit region 221 conducting with the Q switch drive circuit 33 is reinforced and insulated with respect to another circuit region 223. Thus, transmission and reception of signals between the circuit regions 221 and 223 are carried out through an insulative signal transmitting element 222 such as a photocoupler.

According to the present embodiment, the return light from the workpiece W can be received through the optical path substantially coaxial with the laser light L by the camera 56 attached to the movable mounting part 573 of the housing frame 60, and the check and adjustment of the processing position can be carried out at high accuracy before the processing. The camera 56 can be detached from the movable mounting part 573 to be replaced with the desired camera. However, when detaching the camera 56, the camera cover 70 for covering the camera 56 first needs to be detached from the housing frame 60. When the camera cover 70 is detached, this detachment is detected by the limit SW 80 and the output of the laser light L is stopped. According to such a configuration, when the camera 56 is detached from the movable mounting part 573, the laser light L can be prevented from leaking out from the opening of the movable mounting part 573 as the return light from the workpiece W or the scattered light by the emission optical system and the like.

Furthermore, the laser light L can be prevented from leaking out from the movable mounting part 573 even when the camera 56 is mistakenly detached during the irradiation period of the laser light L. Thus, the user can detach the camera 56 any time. The laser light L can be output even if the camera 56 is not attached.

When the camera cover 70 is detached from the housing frame 60, the output of the laser light L can be reliably stopped by blocking the power supply to the excitation light source power supply 35.

Furthermore, the detachment of the camera cover 70 from the housing frame 60 can be reliably detected, and the output stop state of the laser light L can be prevented from being mistakenly released by disconnection of the transmission of the cover detection signal although the camera cover 70 is not attached. The variations in the position of the imaging element 56*a* in the camera 56 and the attachment angle θ of the camera 56 can be adjusted.

In the present embodiment, an example of a case of detecting the detachment of the camera cover 70 and closing the oscillator shutter 43 and the camera shutter 55 has been described, but the present invention is not limited thereto. For example, there may be adopted a configuration of carrying out control of closing the camera shutter 55 at the time of the output of the laser light. According to such a configuration, the laser light L can be prevented from leaking out from the movable mounting part 573 even if the camera 56 is mistakenly detached during the irradiation period of the laser light L. Thus, the user can safely detach the camera 56 any time. The laser light L can also be output in a state in which the camera 56 is not attached.

In the present embodiment, there has been described an example of a case in which the cover detection section includes a mechanical contact that shifts to the blocking state when the camera cover 70 is detached from the housing frame 60, but the present invention is not limited to the case in which the configuration of the cover detection section is the mechanical contact. For example, the detachment of the camera cover 70 may be detected by a contactless circuit using a photo-interrupter.

Furthermore, in the present embodiment, an example of a case of blocking the power supply with respect to the excitation light source power supply 35 based on the cover detection signal has been described, but the configuration of forcibly stopping the output of the laser light L is not limited thereto. For example, the output of the laser light L may be stopped by controlling the Q switch 414 of the laser oscillator 41.

Moreover, in the present embodiment, there has been described an example of a case in which the laser marker 20 is the SHG laser marking device has been described, but the laser processing device according to the present invention is not limited thereto. For example, the present invention can also be applied to a fiber laser marking device. The fiber laser marking device is a laser marker that uses a fiber doped with Yb (ytterbium) as an amplifier.

What is claimed is:

1. A laser processing device including a controller for controlling a laser generator for generating laser light adapted to process a processing target, and a head with a scanning optical system for scanning the laser light with respect to the processing target and a housing for accommodating the scanning optical system; the laser processing device comprising:
- a camera for photographing the processing target, the camera being removably attached to the housing and having a light receiving axis branched from an emission axis of the laser light;
- a camera cover being removably attached to the housing to cover the camera;
- a cover detection section for detecting detachment of the camera cover from the housing; and
- a laser output control section for prohibiting emission of the laser light to the processing target based on the detection result of the cover detection section.

2. The laser processing device according to claim 1, further comprising a shutter for blocking a light receiving path of the camera in an openable/closable manner and blocking the light receiving path upon output of the laser light.

3. The laser processing device according to claim 1, wherein
- the camera cover includes a projection; and
- the cover detection section includes a mechanical contact that shifts to a conducting state when the camera cover is attached to the housing and the projection is brought into contact, and shifts to a blocking state when the camera cover is detached from the housing.

4. The laser processing device according to claim 1, wherein
- the laser generator includes an excitation light source for generating excitation light and a laser oscillator for generating the laser light based on the excitation light;
- an excitation light source power supply for supplying power to the excitation light source using a commercial power supply is further arranged; and
- the laser output control section controls the power supply with respect to the excitation light source power supply based on the detection result of the cover detection section.

5. The laser processing device according to claim 4, wherein
- the excitation light source includes a light emitting element and a drive circuit for supplying a drive current to the light emitting element; and
- the laser output control section instructs a current value of the drive current with respect to the drive circuit based on the detection result of the cover detection section.

6. The laser processing device according to claim 1, further comprising a notifying section for notifying that the camera cover is detached from the housing based on the detection result of the cover detection section.

7. The laser processing device according to claim 1, further comprising a camera mount for arranging the camera on an exterior of the housing, the camera mount including an offset adjustment mechanism for making a light receiving axis of the camera side substantially coincide with a light receiving axis of the housing side and an angle adjustment mechanism for adjusting an attachment angle of the camera with the light receiving axis as a center.

8. The laser processing device according to claim 1, further comprising:

a telecentric lens for making an emission angle of the laser light constant irrespective of an incident angle of the laser light, the telecentric lens being arranged on the processing target side than the scanning optical system; and an optical splitter for branching a light receiving path of the camera from the emission path of the laser light, the optical splitter being arranged on the laser generator side than the scanning optical system.

* * * * *